(12) United States Patent
Nagatsuka

(10) Patent No.: US 10,052,772 B2
(45) Date of Patent: Aug. 21, 2018

(54) ROLL ROTATION STRUCTURE IN A ROBOT

(71) Applicant: THK CO., LTD., Tokyo (JP)

(72) Inventor: Masaki Nagatsuka, Tokyo (JP)

(73) Assignee: THK CO., LTD., Tokyo (JP)

(*) Notice: Subject to any disclaimer, the term of this patent is extended or adjusted under 35 U.S.C. 154(b) by 0 days.

(21) Appl. No.: 15/531,065

(22) PCT Filed: Nov. 25, 2015

(86) PCT No.: PCT/JP2015/083048
§ 371 (c)(1),
(2) Date: May 26, 2017

(87) PCT Pub. No.: WO2016/084839
PCT Pub. Date: Jun. 2, 2016

(65) Prior Publication Data
US 2017/0326736 A1    Nov. 16, 2017

(30) Foreign Application Priority Data

Nov. 28, 2014   (JP) .................................. 2014-241956

(51) Int. Cl.
*B25J 17/02* (2006.01)
*B25J 9/00* (2006.01)
*B25J 9/10* (2006.01)

(52) U.S. Cl.
CPC ......... *B25J 17/0291* (2013.01); *B25J 9/0009* (2013.01); *B25J 9/0087* (2013.01); *B25J 9/10* (2013.01)

(58) Field of Classification Search
CPC .............................. B25J 17/0291; B25J 9/123
See application file for complete search history.

(56) References Cited

U.S. PATENT DOCUMENTS 5,845,540 A    12/1998 Rosheim
6,211,591 B1 *  4/2001 Kowalski ................ B25B 21/00
                                                   310/112
(Continued)

FOREIGN PATENT DOCUMENTS

JP    2006-198703 A    8/2006
JP    2011-224752 A   11/2011
(Continued)

OTHER PUBLICATIONS

Notification of Transmittal of Translation of the International Preliminary Report on Patentability (Form PCT/IB/338) issued in counterpart International Application No. PCT/JP2015/083048 dated Jun. 8, 2017, with Forms PCT/IB/373 and PCT/ISA/237. (8 pages).

(Continued)

*Primary Examiner* — Terence Boes
(74) *Attorney, Agent, or Firm* — Westerman, Hattori, Daniels & Adrian, LLP

(57) ABSTRACT

A roll rotation structure for rotationally driving, in a roll direction of a robot, an arm unit mounted on a shoulder part of the robot through a roll support part comprises a linear motion actuator having an output shaft that moves linearly, a mounting part by which the linear motion actuator is mounted on the shoulder part in such a manner that a main body of the linear motion actuator is located at the side of a main body of the robot adjacent to the shoulder part, and that the output shaft of the linear motion actuator can be drawn into and out of the shoulder part, and a connection part that connects the output shaft and the arm unit in such a manner that an output from the output shaft of the linear motion actuator produces an angular moment in the roll direction in the roll support part.

8 Claims, 15 Drawing Sheets

(56) References Cited

U.S. PATENT DOCUMENTS

| | | | |
|---|---|---|---|
| 6,337,547 B1* | 1/2002 | Jouan de Kervenoael | B25J 9/102 318/15 |
| 8,336,420 B2 | 12/2012 | Carter et al. | |
| 9,375,851 B2 | 6/2016 | Nagatsuka | |
| 2011/0185837 A1 | 8/2011 | Klfayad et al. | |
| 2016/0176044 A1* | 6/2016 | Cole | B25J 9/104 700/258 |
| 2017/0244284 A1* | 8/2017 | Takahashi | H02J 50/12 |
| 2017/0326736 A1* | 11/2017 | Nagatsuka | B25J 17/0291 |

FOREIGN PATENT DOCUMENTS

| | | |
|---|---|---|
| JP | 2011-528622 A | 11/2011 |
| JP | 2012-148366 A | 8/2012 |
| JP | 2013-91146 A | 5/2013 |
| JP | 2014-83653 A | 5/2014 |
| WO | 2009/144320 A1 | 3/2009 |
| WO | 2009/144320 A1 | 12/2009 |

OTHER PUBLICATIONS

Notice of Reason for Rejection dated Oct. 4, 2016, issued in Japanese application No. 2014-241956, with English translation (10 pages).

International Search Report dated Jan. 12, 2016, issued in counterpart International Application No. PCT/JP2015/083048 (2 pages).

Office Action dated Jun. 13, 2018, issued in counterpart German Application No. 112015005361.1, with English translation. (6 pages).

* cited by examiner

ROLL ROTATION STRUCTURE IN A ROBOT

TECHNICAL FIELD

The present invention relates to a rotation structure for driving an arm unit of a robot to rotate in a roll direction.

BACKGROUND ART

In recent years, there have been actively made research and development of not only industrial robots but also consumer robots, which play various roles for people's livelihood. Among such robots, human-like robots (humanoid robot) being able to walk in erect posture are expected to be able to substitute for actions of human beings. In such humanoid robots, many joint parts are provided for imitating actions or motions of a human being, and a variety of motions having a plurality of degrees of freedom in the joint parts are required. For that reason, in each of the joint parts of the humanoid robots, the number of actuators such as servo-motors mounted therein increases corresponding to the degrees of freedom given to each joint part, with the result that it becomes difficult to reduce the size of each joint part due to this, and the structure and arrangement of the actuators are made complicated.

Here, for example, in patent literature 1 (in particular, FIG. 3), there is disclosed a structure for rotationally driving an arm unit of a robot around a roll axis. Specifically, a servo-motor for roll rotation is arranged in the interior of a housing of a shoulder part which is adjacent to a robot body and with which the arm unit is connected, and an output of the servo-motor is connected to the roll axis or shaft through a belt. As a result of this, rotation of an output shaft of the servo-motor will be transmitted as rotation around the roll axis.

CITATION LIST

Patent Literature

Patent Literature 1: Japanese patent laid-open publication No. 2006-198703

SUMMARY OF THE INVENTION

Technical Problem

With the above-mentioned conventional roll rotation structure of the arm unit, the actuator (servo-motor) for rotational driving around the roll axis is arranged in the shoulder part. In such an arrangement structure, a space for receiving the actuator is required for the shoulder part, so the shoulder part can not but help become large. In addition, when the actuator is arranged in the inside of the shoulder part, the distance between the roll axis of the arm unit connected to the shoulder part and the output shaft of the actuator will be short, and a load from the arm unit will tend to be easily transmitted to the actuator. For that reason, a large rigidity will be required with respect to the actuator, as a result of which the actuator will be caused to increase in size, and hence, a further increase in size of the shoulder part will be required.

In addition, if the actuator is arranged in the shoulder part, an increase in the rotation load at the time of rotational driving of the arm unit around the roll axis or the pitch axis may be caused, and from this, too, the actuator for rotational driving around each axis is also increased, thus making it unavoidable to increase the size of the shoulder part. The increase in size of the actuator and the shoulder part is not desirable because it not only deteriorates the external design of the robot, but also causes an increase in the energy consumption due to an increase in the weight of the robot, and in particular a limitation of a movable range of the robot around the shoulder part (shoulder joint).

The present invention has been made in view of the problems as mentioned above, and has for its object to provide a structure related to roll rotation driving of an arm unit for avoiding an increase in size of a shoulder part of a robot.

Solution to Problem

In the present invention, in order to solve the above-mentioned problems, there is adopted a construction in which a linear motion actuator is adopted as an actuator for performing rotational driving of an arm unit of a robot around a roll axis, and in which the linear motion actuator is also arranged in such a manner as to be located outside of a shoulder part. This can suppress or reduce the size of the shoulder part, thereby making it possible to eliminate the above-mentioned inconveniences or problems caused due to the increase in size of the shoulder part.

Specifically, the present invention resides in a roll rotation structure for rotationally driving, in a roll direction of a robot, an arm unit mounted on a shoulder part of the robot through a roll support part so as to be rotatable in the roll direction of the robot, the roll rotation structure comprising: a linear motion actuator having output shaft that moves linearly; a mounting part by which the linear motion actuator is mounted on the shoulder part in such a manner that a main body of the linear motion actuator is located at the side of a main body of the robot adjacent to the shoulder part, and that the output shaft of the linear motion actuator can be drawn into and out of the shoulder part; and a connection part that connects the output shaft and the arm unit in such a manner that an output from the output shaft of the linear motion actuator produces an angular moment in the roll direction in the roll support part of the arm unit.

The roll rotation structure according to the present invention achieves the rotational driving of the arm unit in the roll direction by transmitting an output of the linear motion actuator to the arm unit. Here, note that the roll axis in the robot in the present invention is an axis along a direction of movement (a fore and aft direction) of the robot, and the rotation in the roll direction is a rotation around the roll axis, and is hereinafter referred to as a roll rotation. Also, note that in this robot, there exist a pitch axis and a yaw axis in addition to the roll axis; the pitch axis is an axis along a side (a left and right direction) of the robot; and the yaw axis is in a vertical direction of the robot (a direction extending from a leg of the robot to a head thereof). Then, a rotation around the pitch axis is referred to as a pitch rotation, and a rotation around the yaw axis is referred to as a yaw rotation.

In the robot, the arm unit is mounted to the roll support part so as to be able to perform roll rotation with respect to the shoulder part. Then, the shoulder part is connected to the main body side of the robot, and the roll rotation of the arm unit is achieved by the output from the linear motion actuator. Here, the mounting of the linear motion actuator to the shoulder part by means of the mounting part is achieved in such a manner that the main body of the linear motion actuator is not located at the shoulder part but at the main body side of the robot, and that in this state, the output shaft of the linear motion actuator can be drawn into and out of the shoulder part. In other words, the mounting of the linear motion actuator by means of the mounting part is carried out in such a manner that the output shaft of the linear motion actuator can be drawn into and out of the interior of the shoulder part, so as to transmit its output for the roll rotation driving of the arm unit to the arm unit.

Here, note that the output shaft of the linear motion actuator inserted into the interior of the shoulder part from the outside thereof is connected with the arm unit by means of the connection part. With the connection by this connection part, the output of the linear motion actuator will be transmitted to the arm unit, thus achieving roll rotation of the arm unit around a support point by means of the roll support part. Here, the connection by the connection part may be such that the connection of the output shaft and the arm unit is carried out directly or through a predetermined power transmission mechanism such as a linkage mechanism, a speed reduction mechanism, etc., as far as the roll rotation of the arm unit can be made.

With the roll rotation structure in the robot constructed in this manner, the roll rotation of the arm unit mounted on the shoulder part is achieved by the output from the linear motion actuator arranged at the outside of the shoulder part being transmitted to the arm unit through the output shaft which is moved into and out of the interior of the shoulder part. For that reason, the structure requiring an accommodation space inside the shoulder part for a source of power for the roll rotation of the arm unit serves as a connection part with the output shaft of the linear motion actuator, and the main body of the linear motion actuator itself is not accommodated in the shoulder part, thus making it possible to suppress or reduce the size of the shoulder part. In addition, the volume of a space occupied by the output shaft of the linear motion actuator at the time of the linear motion thereof becomes in general smaller in comparison with the case of a rotary actuator such as a servo-motor having a rotation shaft, and hence, a mounting mode in which the linear motion actuator is arranged at the outside of the shoulder part as in the present invention is extremely useful for suppression or reduction in size of the shoulder part.

Then, because the size of the shoulder part is made suppressible as mentioned above, it becomes possible to eliminate inconveniences resulting from the increase in size of the shoulder part, for example, the deterioration of the external design of the robot, the increase in the energy consumption due to the increase in weight of the robot, the limitation of the movable range of the robot around the shoulder part, etc.

Advantageous Effects of Invention

It is possible to provide a structure related to roll rotation driving of an arm unit for avoiding an increase in size of a shoulder part of a robot.

MODES FOR CARRYING OUT THE INVENTION

Hereinafter, specific modes or embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

Embodiment 1

<Construction of Robot 10>

Figure 1:
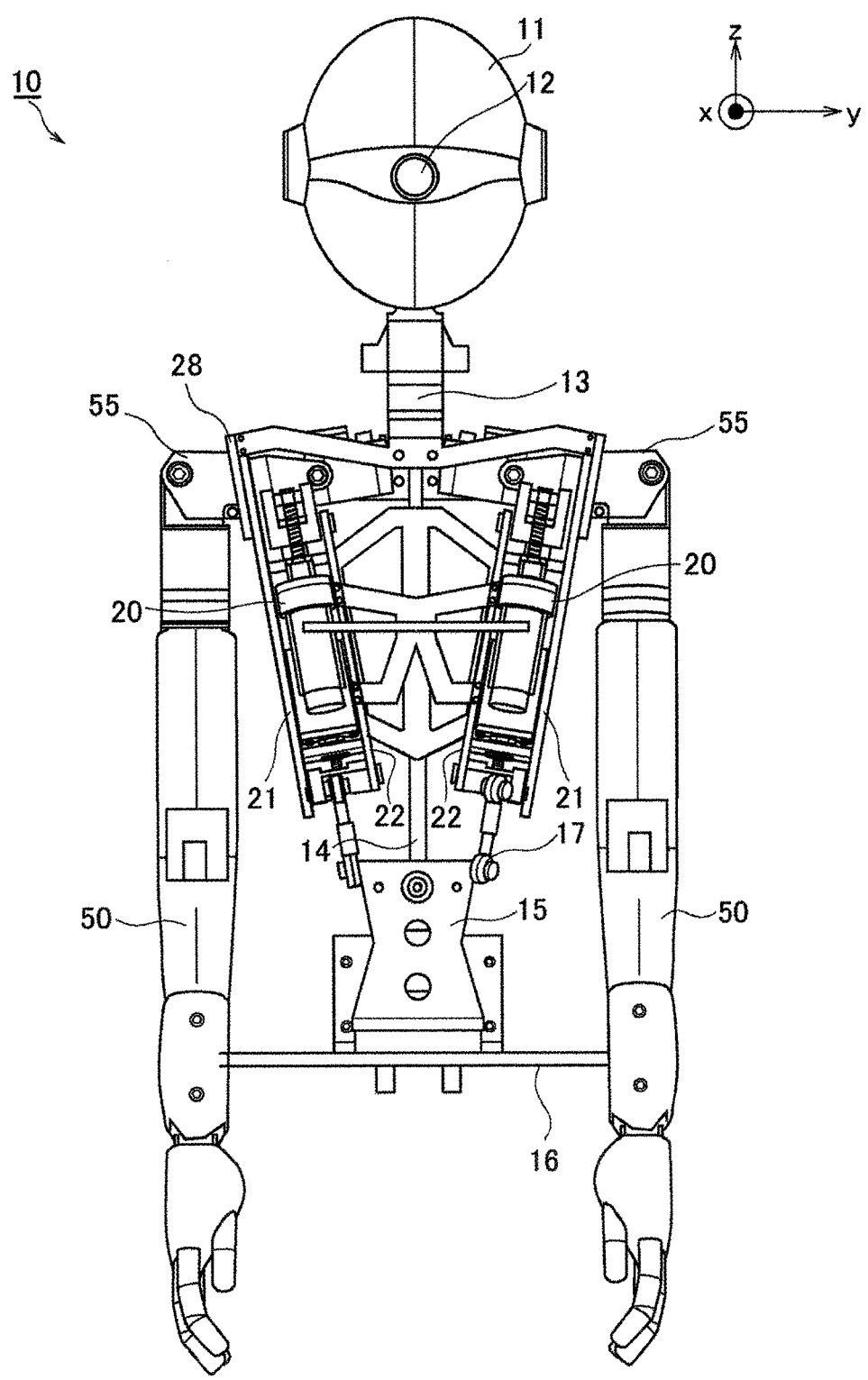
FIG. 1 is a front elevation of a robot to which a roll rotation structure according to the present invention is applied.
Figure 2:
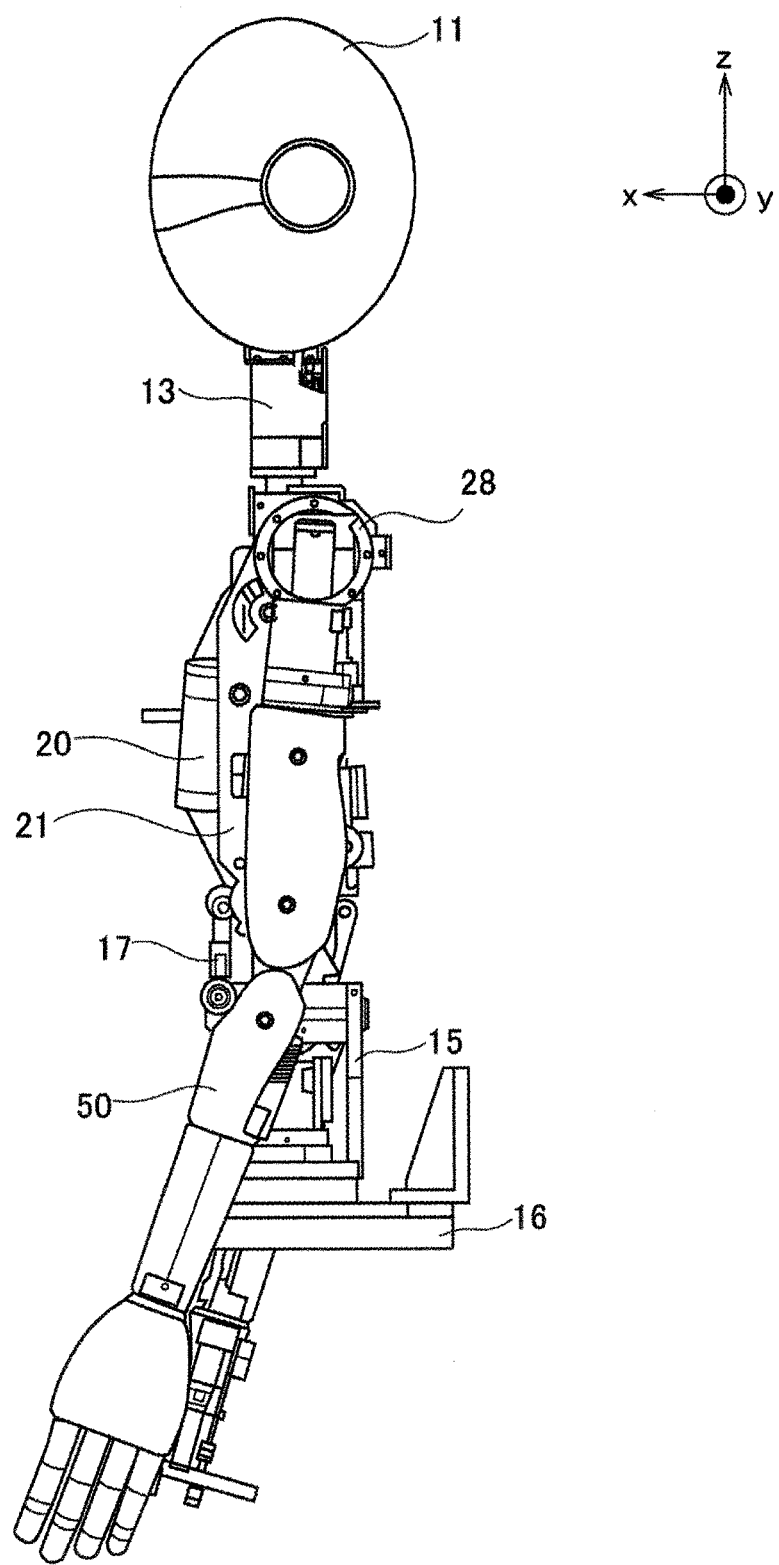
FIG. 2 is a side elevation of the robot shown in FIG. 1.
Figure 3:
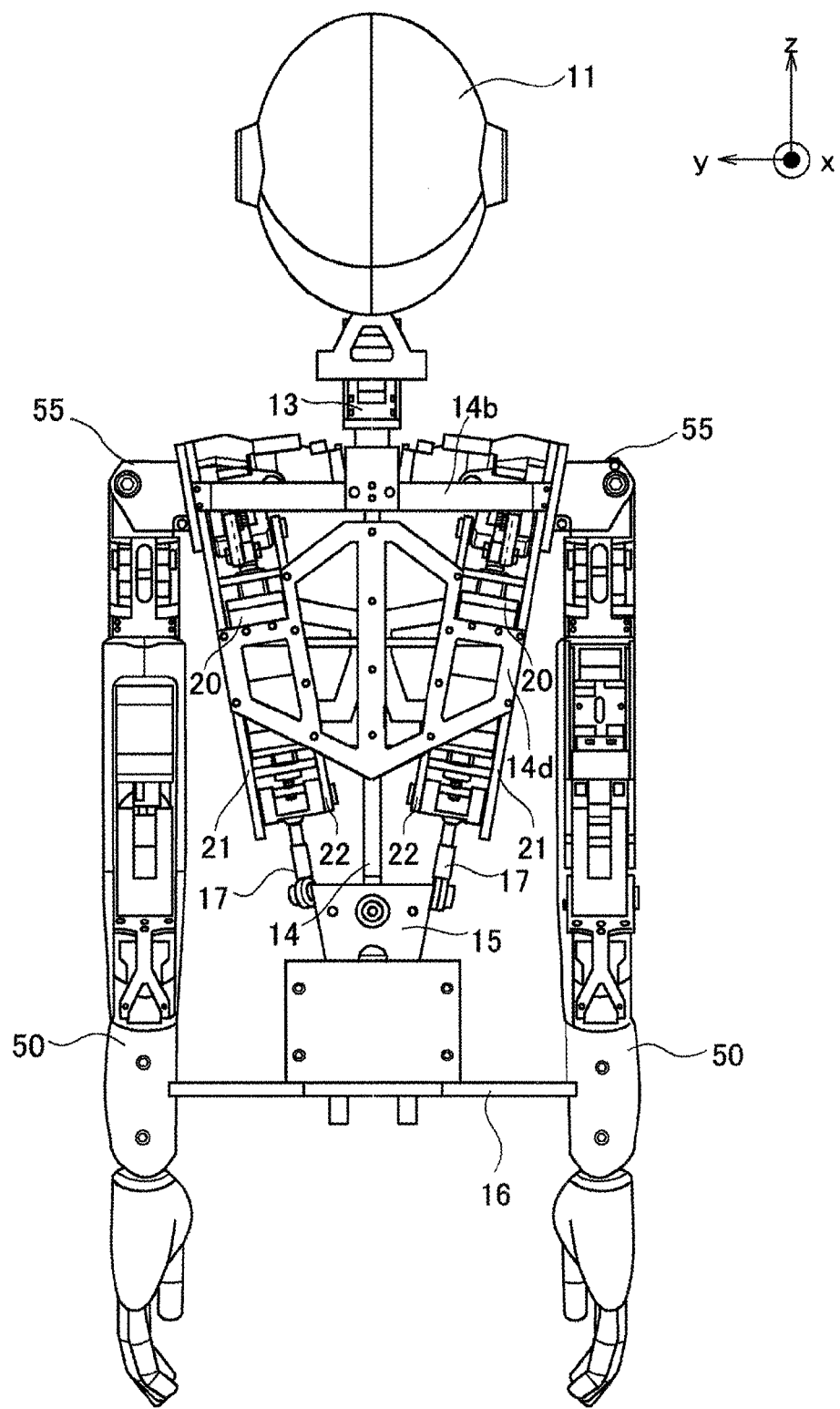
FIG. 3 is a rear elevation of the robot shown in FIG. 1.

Reference will be made to the overall construction of a robot 10 on which a roll rotation structure for roll rotation of each arm unit 50 according to the present invention is mounted, based on FIGS. 1 through 3. This arm unit 50 is connected to a driving unit 20 to be described later through a shoulder part 55, and is further mounted on a main body side (an upper half body skeletal structure side to be described later) of the robot 10. FIG. 1 is a front elevation of the robot 10, FIG. 2 is a left side view of the robot 10, and FIG. 3 is a rear elevation of the robot 10. Also, note that in this embodiment, assuming that the direction of advancement of the robot 10 is set as a positive or plus direction of an x axis, and that a left hand direction as viewed from the robot 10 is set as a positive or plus direction of a y axis, and that an antigravity direction in the robot 10 is set as a positive or plus direction of a z axis, the x axis is a roll axis, and the y axis is a pitch axis, and the z axis is a yaw axis.

Accordingly, a rotation around the x axis becomes a roll rotation, and a rotation around the y axis becomes a pitch rotation, and a rotation around the z axis becomes a yaw rotation. In addition, an upward direction in this embodiment is the positive or plus direction on the z axis, i.e., the antigravity direction, and on the other hand, a downward direction is the negative or minus direction of the z axis, i.e., the gravity direction. A left and right direction is a left and right direction when viewed from the robot 10, wherein the positive or plus direction on the y axis becomes a left direction, and a negative or minus direction on the y axis becomes a right direction.

The robot 10 is a humanoid robot and has a body which imitates a skeletal structure of a human being. Schematically, the skeletal structure of an upper half body of the robot 10 (hereinafter, referred to simply as an "upper half body skeletal structure") is formed by: a backbone part 14 extending in a z axis direction in FIG. 1 and including various kinds of bone parts 14a-14d formed of sheet metal to be described later; a hip bone part 15 connected with the backbone part 14 so as to support the backbone part 14; and a pelvic part 16 further supporting the hip bone part 15, with a pair of unillustrated leg units of the robot 10 being connected thereto. Then, to the backbone part 14, there is connected a neck 13 of the robot 10, on which is further arranged a head 11. Here, note that a camera 12 for photographing outside is mounted on the head 11. Although it becomes possible for the head 11 to perform a roll rotation and a yaw rotation with respect to the backbone part 14 due to the connection of the head 11 with the backbone part 14 through this neck portion 13, the internal structure of the robot for these rotations does not form the core of the present invention, and hence, the detailed explanation thereof is omitted in this description.

Figure 4:
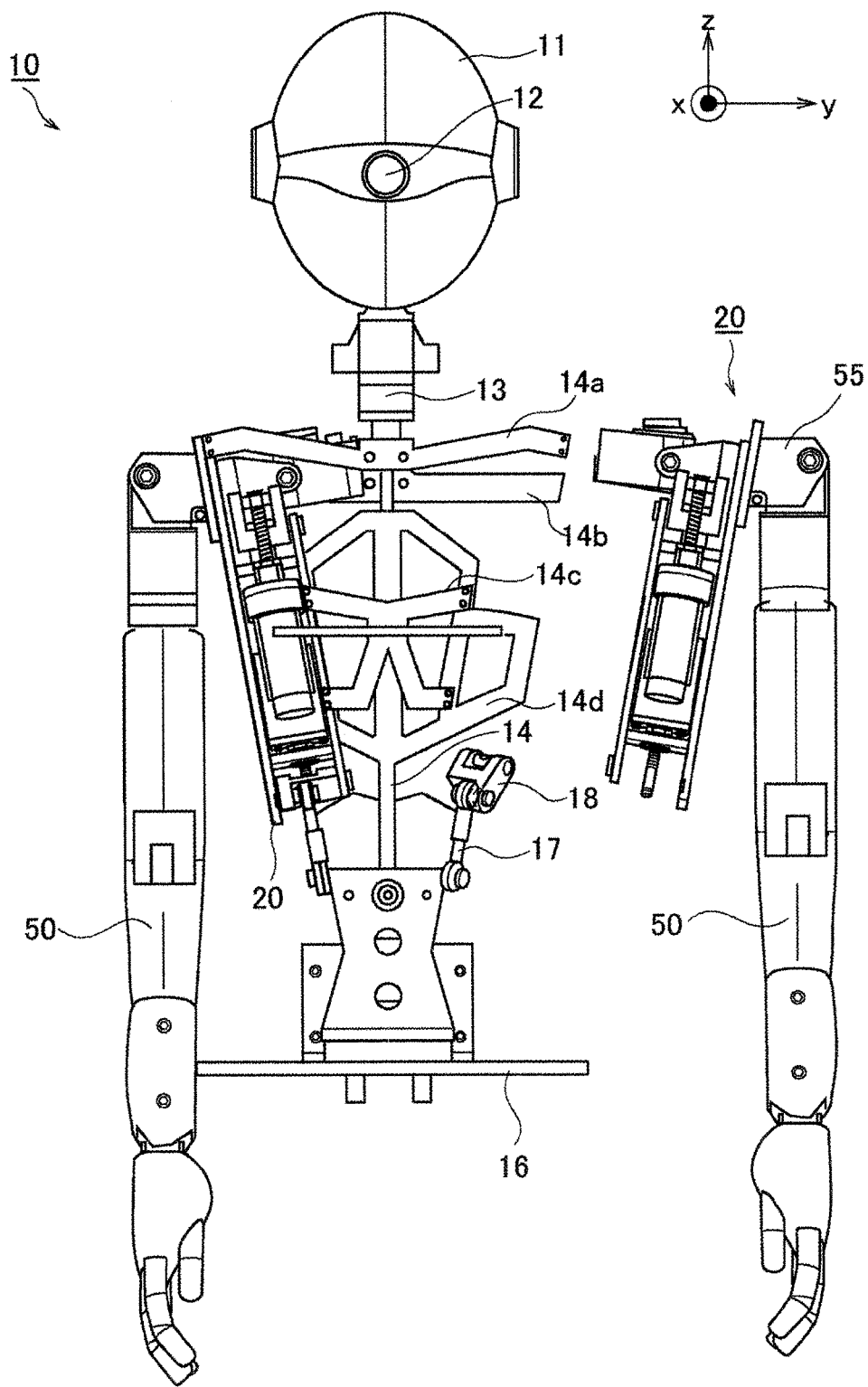
FIG. 4 is a view showing a state where a shoulder part, an arm unit and a driving unit are removed, in the robot shown in FIG. 1.

In addition, in the robot 10, driving units 20 for managing the drive of the upper half of the body are arranged corresponding to an upper right half body and an upper left half body, respectively. Here, as shown in FIG. 4, an anterior clavicular part 14a at the front side of the robot and a posterior clavicular part 14b at the back side of the robot are connected to the backbone part 14 at locations positioned in shoulder parts of the robot 10 in such a manner as to extend toward the sides of the robot 10. Moreover, an anterior sternal part 14c at the front side of the robot and a posterior sternal part 14d at the back side of the robot are connected to the backbone part 14 at locations positioned in a chest part (a portion lower than the shoulder parts) of the robot 10 similarly in such a manner as to extend toward the sides of the robot 10. By these bone parts 14a-14d and the backbone part 14, there are formed predetermined spaces at the right and left sides of the interior of the upper half body of the robot 10 across the backbone part 14, respectively, and the driving units 20 are arranged so as to be received in the predetermined spaces at the right and left sides, respectively, and are connected to the individual bone parts 14a-14d. Accordingly, the two driving units 20 are mounted in the interior of the robot 10. The bone parts 14a-14d are formed of flat plate-shaped sheet metal thinner than the thickness of the backbone part 14, so the mounting of the driving units 20 with respect to the backbone part 14 will be carried out relatively resiliently. These bone parts 14a-14d correspond to an upper half body support part of the present invention. Here, note that the details of the mounting of the driving units 20 will be described later.

<Construction for Rotational Driving of Arm Unit 50>

In FIG. 4, there is shown a state in which an arm unit 50 at the left side of the robot 10 is connected with a corresponding driving unit 20 for the upper left half body through a shoulder part 55, and is removed in unison therewith from the upper half body skeletal structure of the robot 10. Thus, the driving unit 20 is constructed so as to be removable from the upper half body skeletal structure of the robot 10 together with the corresponding arm unit 50 and the corresponding shoulder part 55, whereby assembly efficiency and maintenance of the robot 10 are kept in a suitable manner. In this driving unit 20, a rotation driving mechanism for pitch rotation of the arm unit 50, which comprises a link mechanism, is mounted, and an output from an actuator 24 for pitch rotation is transmitted to the corresponding arm unit 50 by this rotation driving mechanism, whereby pitch rotation driving of the arm unit 50 will be carried out. In addition, on the driving unit 20, there is arranged an actuator 26 for roll rotation driving of the arm unit 60.

Figure 5:
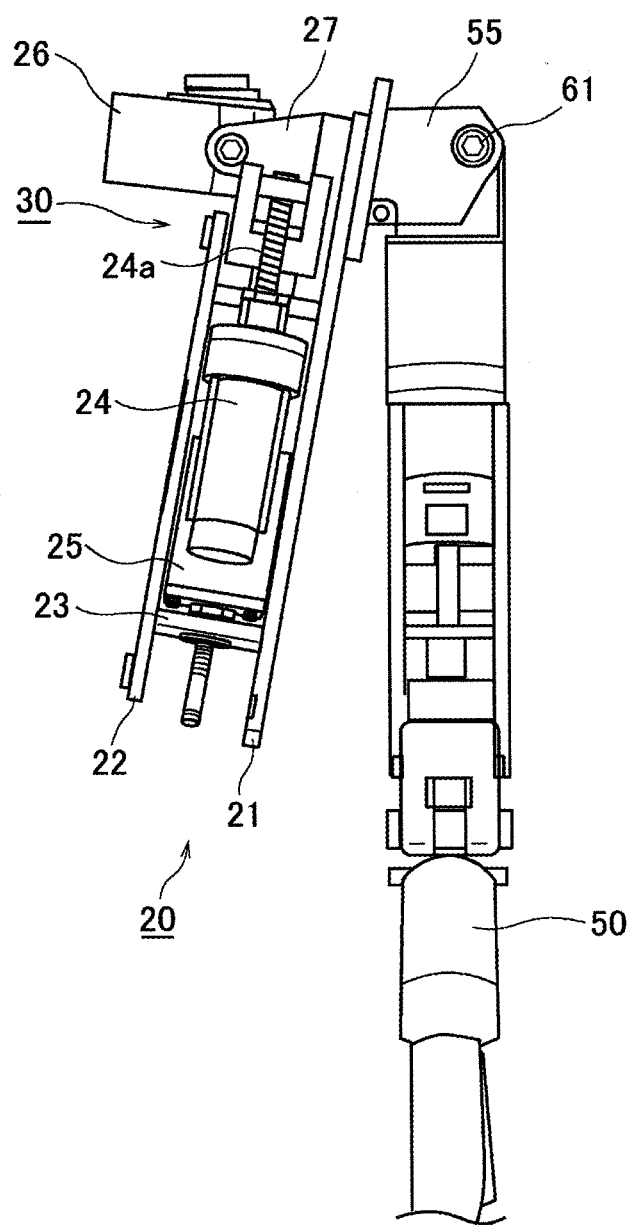
FIG. 5 is a view showing the driving unit removed in FIG. 4.
Figure 6:
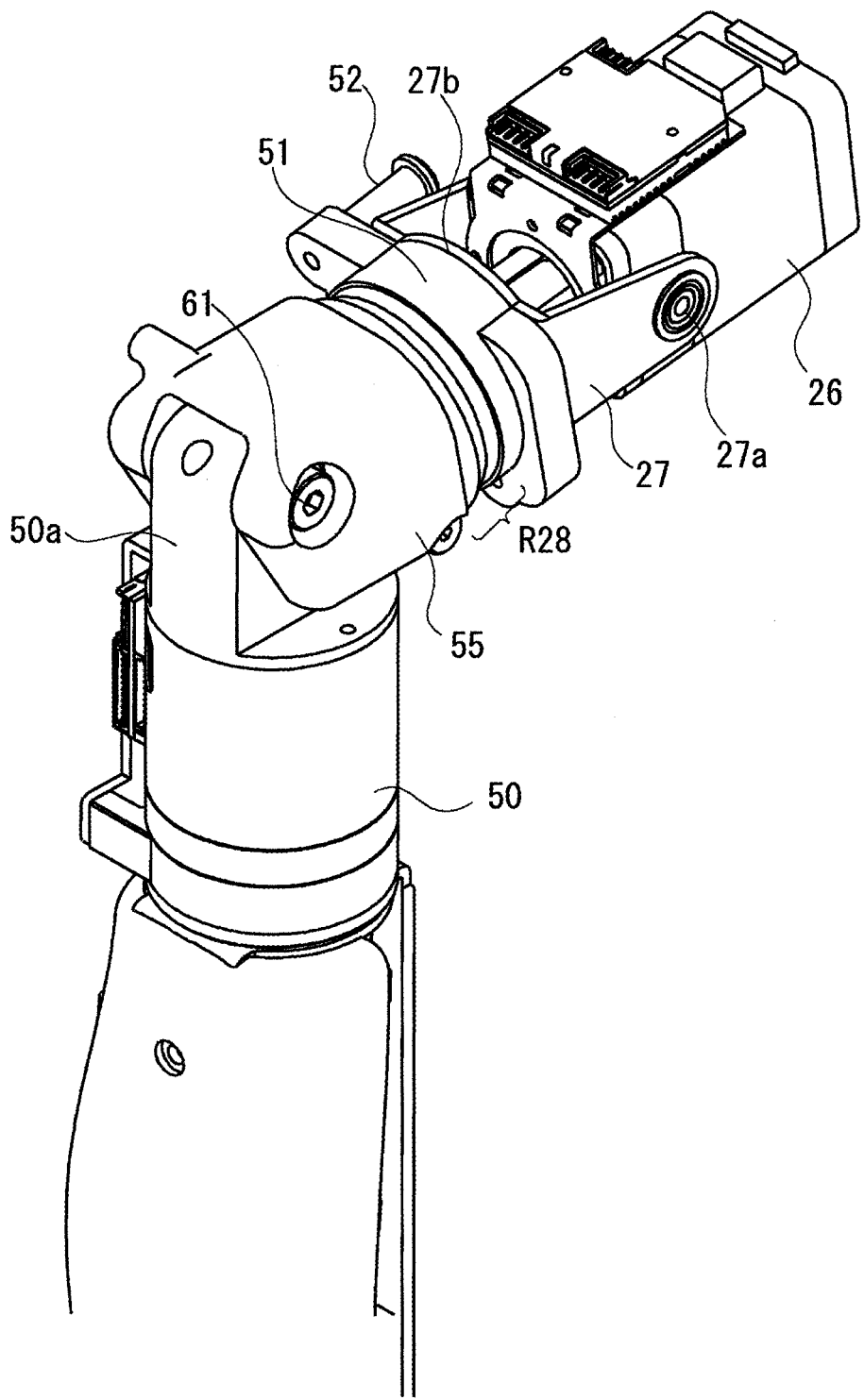
FIG. 6 is a first view showing an external appearance of the roll rotation structure related to roll rotation driving of the arm unit.
Figure 7:
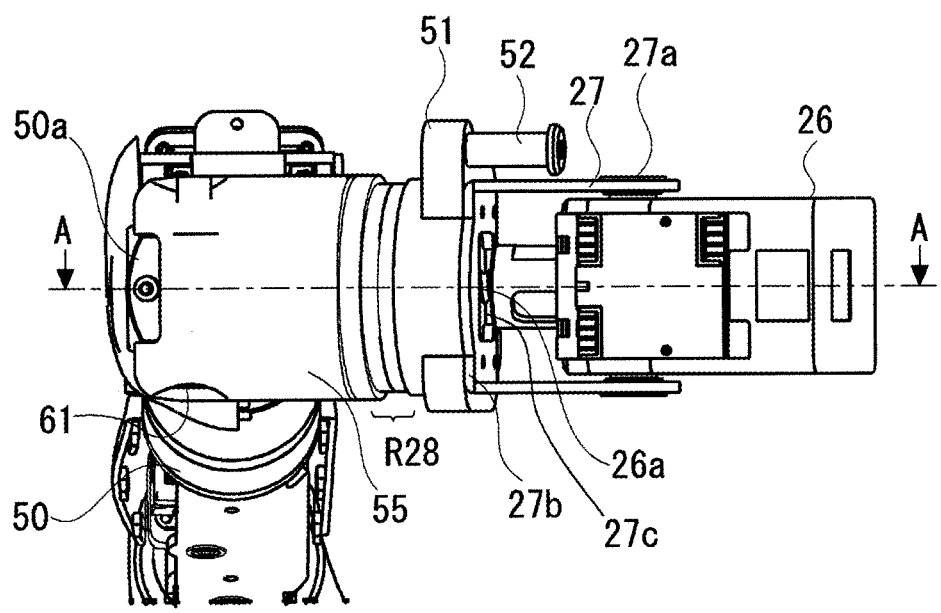
FIG. 7 is a second view showing the external appearance of the roll rotation structure related to roll rotation driving of the arm unit.
Figure 8:
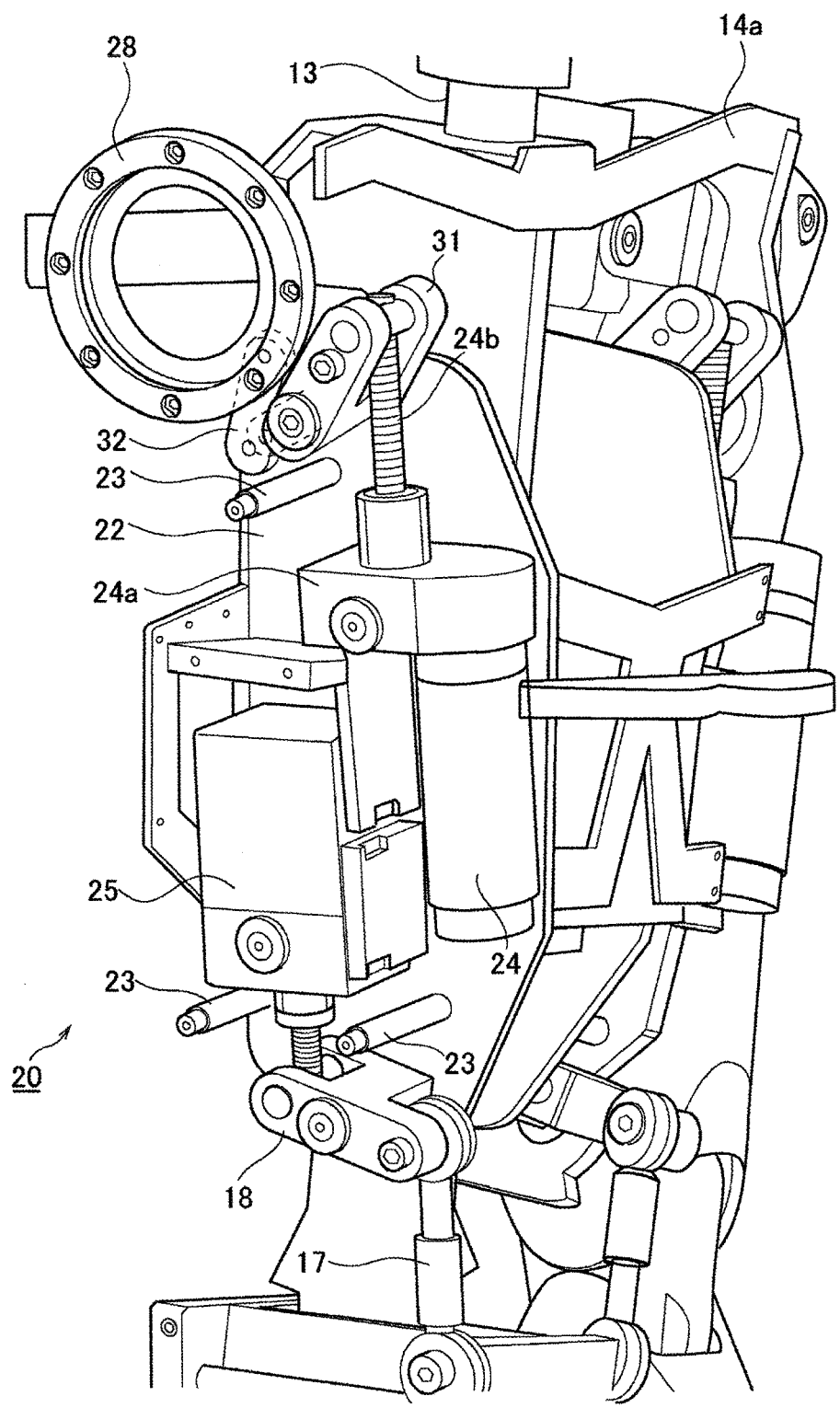
FIG. 8 is a first view showing the construction of a rotation driving mechanism for pitch rotation of the arm unit.

Accordingly, based on FIG. 5 through FIG. 8, reference will be made to a construction for the pitch rotation driving and the roll rotation driving, together with a specific construction of the arm unit 50. In FIG. 5, there are disclosed the driving unit 20 for the upper left half body of the robot 10 and the arm unit 50 mounted thereon. In addition, FIG. 6 shows the construction of the arm unit 50 in which a depiction of the driving unit 20, etc., is eliminated from the construction shown in FIG. 5, and is specifically a perspective view of the construction in which the actuator 26 for the roll rotation of the arm unit 50 is mounted on the shoulder part 55 on which the arm unit 50 is mounted. Then, FIG. 7 is a top view of the arm unit 50, etc., shown in FIG. 6. In addition, in FIG. 8, there is disclosed a detailed structure of the driving unit 20 for the upper right half body of the robot 10. Here, note that in FIG. 8, in order to show the interior of the driving unit 20, a part of the construction thereof (the construction of an outer base plate 21, etc., to be described later) is omitted. Moreover, in this description, the driving unit 20 for the upper left half body and the driving unit 20 for the upper right half body have the same construction, and so, an explanation given based on FIG. 5 and FIG. 8 is applied to the driving units 20 and the rotation driving mechanisms for pitch rotation in the interiors thereof at the opposite sides.

Here, as shown in FIG. 6 and FIG. 7, the arm unit 50 is rotatably supported in such a manner that the roll rotation of a connection plate 50a in the shape of a thick board formed at an end thereof becomes roll rotatable around a roll support shaft 61 with respect to the shoulder part 55. This support by the roll support shaft 61 corresponds to the support by a roll support part according to the present invention. Then, a plate 51 is arranged at an end of the shoulder part 55 opposite to its end at which the arm unit 50 is mounted. This plate 51 corresponds to a fixed plate according to the present invention, and the plate 51 is a member to which an angular moment for pitch rotation driving of the arm unit 50 is transmitted, as will be described later, and at the same time is also a member on which the actuator 26 for the roll rotation driving of the arm unit 50 is mounted. Here, note that a region R28 at an end of the shoulder part 55 and at an end of the plate 51 adjacent thereto forms a support surface with which the support member 28 to be described later is in contact when supporting the arm unit 50 for pitch rotation.

Then, reference will be made to the construction for pitch rotation driving and roll rotation driving of the arm unit 50. Each driving unit 20 has an accommodation space which is defined by an outer base plate 21 and an inner base plate 22 connected to the upper half body skeletal structure of the robot 10, and by a spacer 23 arranged between both of the base plates. In a state where an arm unit 50 is connected to a corresponding driving unit 20 through a corresponding shoulder part 55, the outer base plate 21 is a base plate arranged at the outer side of the robot 10, i.e., at a side close to the arm unit 50. In addition, the inner base plate 22 is a base plate arranged inside the robot 10. Here, note that the outer base plate 21 is provided with the support member 28 for supporting the arm unit 50 for pitch rotation together with the shoulder part 55. The support member 28 rotatably supports the shoulder part 55 and the arm unit 50 by making contact with the region R28 shown in FIG. 6 and FIG. 7. Accordingly, the arm unit 50 will be connected with the side the driving unit 20 through the support member 28. For this support member 28, it is preferable to adopt a support member which can support loads in all directions, such as a radial road, an axial load, etc., by means of one bearing, in consideration of the point that the arm unit 50 of the robot 10 having a relatively large moment is supported within a limited space volume. For example, it is possible to adopt a cross roller ring manufactured by THK CO., LTD.

Then, the spacer 23 is a rod-shaped member which has a length defining the interval of both the base plates. The construction formed by the outer base plate 21, the inner base plate 22 and the spacer 23 is, so to speak, to form the housing of the driving unit 20, wherein this housing is fixed to the upper half body skeletal structure of the robot 10, and three actuators 24, 25, 26 and a linkage mechanism 30 related to the actuator 24 are arranged there. In particular, the actuator 24 is a pitch rotation actuator for the arm unit 50, and the actuator 25 is a hip bone part driving actuator. The actuator 26 is a roll rotation actuator for the arm unit 50, and corresponds to a linear motion actuator of the present invention. A predetermined linkage mechanism related to the actuator 26 (a linkage mechanism composed of a first roll link part 56 and a second roll link part 57 to be described later) is arranged inside the shoulder part 55, and the details thereof will be described later.

First, the actuator 24 will be explained. The actuator 24 is a linear motion actuator which has a servo-motor, a main body 24a, and an output shaft 24b performing linear movement in the axial direction of the actuator, and is fixed to the outer base plate 21 and the inner base plate 22. The output shaft 24b has a spiral thread groove formed on the outer peripheral surface thereof, and a ball screw nut (not shown) threadedly engaged with the thread groove of the output shaft 24b is received in the main body 24a in such a state that only rotation thereof around an axis line of the main body is permitted. Then, the servo-motor is connected with the main body 24a so as to rotate the ball screw nut, and the movement of the ball screw nut in the axial direction is limited within the main body 24a, so that the output shaft 24b is caused to perform rectilinear movement, i.e., linear motion in the axial direction by the drive of the servo-motor.

Figure 10:
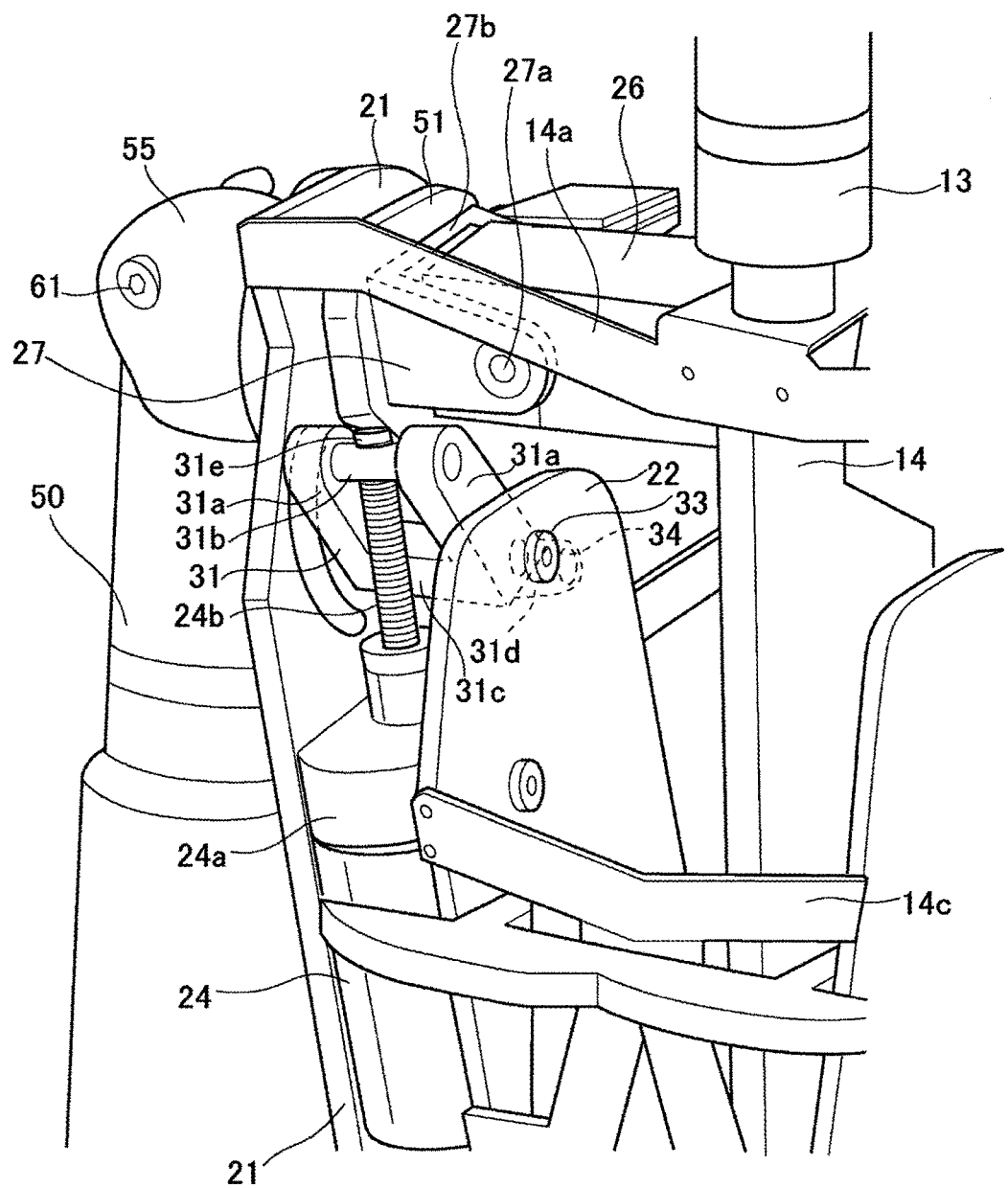
FIG. 10 is a third view showing the construction of the rotation driving mechanism for pitch rotation of the arm unit.
Figure 11:
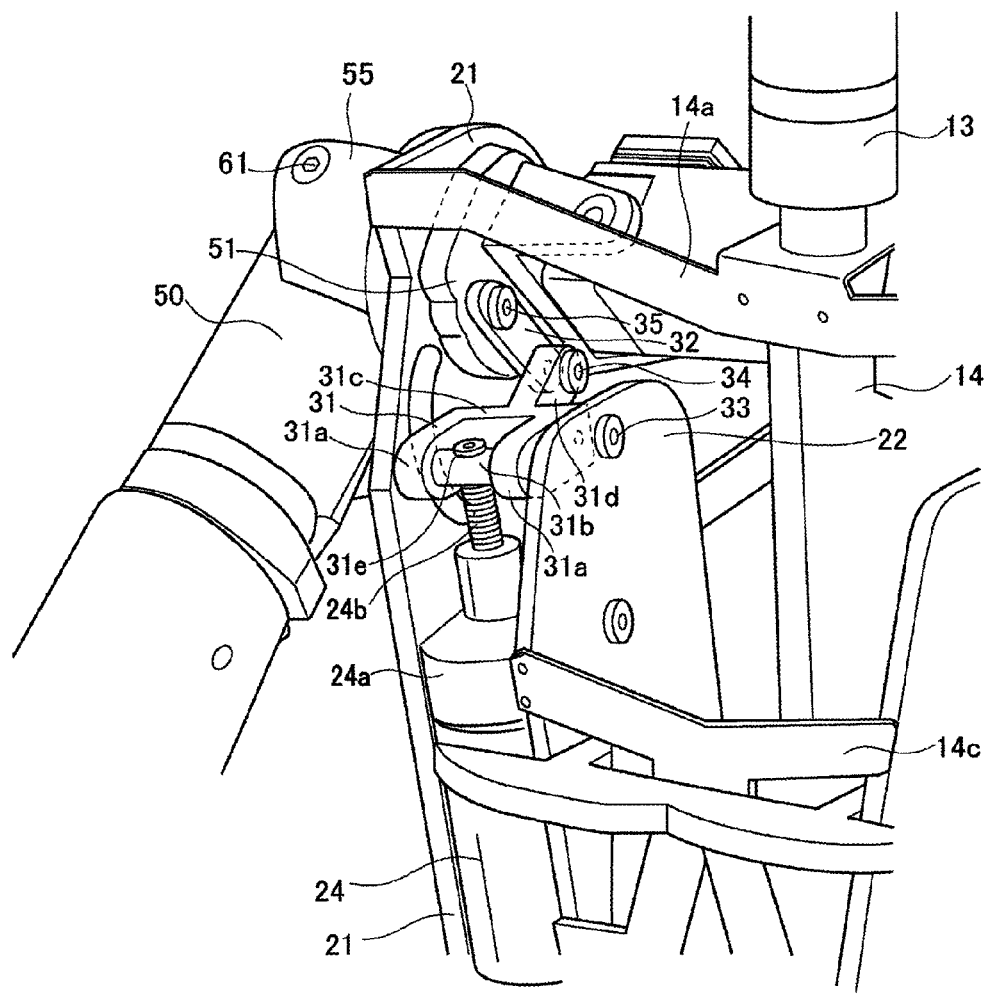
FIG. 11 is a fourth view showing the construction of the rotation driving mechanism for pitch rotation of the arm unit.

The output shaft 24b of the actuator 24 is connected to a first pitch link part 31 among the first pitch link part 31 and a second pitch link part 32 which together constitute the linkage mechanism 30. Here, note that this linkage mechanism 30 corresponds to a rotation driving mechanism for pitch rotation. Then, the first pitch link part 31 has two wall portions 31a extended in the same direction from the opposite ends of a base portion 31c, as shown in FIG. 10 and FIG. 11 to be described later, and a bridge 31b connecting both the wall portions 31a with each other is arranged in such a manner as to be parallel to the base portion 31c. This base portion 31c is supported by a bearing in such a manner as to be free to rotate with respect to the outer base plate 21 and the inner base plate 22, thereby forming a first support point 33. In addition, the output shaft 24b of the actuator 24 is connected to the bridge 31b in such a manner that the direction thereof with respect to the first pitch link part 31 becomes variable, wherein a connection point between the actuator output shaft and the bridge is denoted by 31e. Moreover, a tail portion 31d extending from the base portion 31c is arranged at the opposite side of the bridge 31b across the base portion 31c. The extending direction of the tail portion 31d is not on a straight line connecting between the connection point 31e on the bridge 31b and the first support point 33, but is a direction in which the actuator 24 is not arranged with respect to the straight line, i.e., a direction in which a third support point 35 to be described later is located. Then, the second pitch link part 32 is supported by a bearing in such a manner as to be rotatable at an end of the tail portion 31d (i.e., an end at the opposite side of a connection portion thereof with the base portion 31c), thereby forming a second support point 34.

In this manner, the first pitch link part 31 is formed as a link body which comprises the wall portions 31a, the bridge 31b, the base portion 31c and the tail portion 31d. Then, when setting as a reference the first support point 33 which rotatably supports the link body of the first pitch link part 31, the bridge 31b with which the output shaft 24b of the actuator 24 is connected will be located at one side of the first support point 33, and the tail 31d with which the second pitch link part 32 is connected will be located at the other side of the first support point 33. For that reason, a point at which the output of the actuator 24 acts, i.e., the connection point 31e at which the output of the actuator 24 is inputted to the first pitch link part 31, and a point at which a force is transmitted through the first pitch link part 31 to the side of the second pitch link part 32, i.e., the second support point 34 at which the output from the actuator 24 is outputted to the side of the second pitch link part 32, will have a correlation where they rocks like a seesaw with the first support point 33 as a reference, and thus, the first pitch link part 31 is formed as a rocking link. More specifically, the first pitch link part 31 is formed as follows. That is, when the connection point 31e moves in the upward direction, the second support point 34 will move in the downward direction, and on the contrary, when the connection point 31e moves in the downward direction, the second support point 34 will move in the upward direction. In this manner, by forming the first pitch link part 31 as the rocking link, it is possible to suppress the size, in particular the length dimensions, of a mechanism required to transmit the output of the actuator 24. In addition, by making use of the seesaw shape of the first pitch link part 31, it also becomes possible to attain amplification of the output of the actuator 24, which also contributes to the reduction in size of the actuator 24.

Next, the second pitch link part 32 is rotatably connected at its one end with the tail portion 31d of the first pitch link part 31 at the second support point 34, as mentioned above, and is further supported at its other end by a bearing in such a manner as to be rotatable with respect to the plate 51 connected with an end of the shoulder part 55, thus forming a third support point 35. In this manner, the second pitch link part 32 is formed so as to have a plate-shaped main body including the second support point 34 and the third support point 35, and the second pitch link part 32 serves to transmit a force propagated from the first pitch link part 31 to the plate 51. This plate 51 is a plate connected with the end of the shoulder part 55 rotatably mounted through the support member 28, and pitch rotates together with the arm unit 50 connected with the shoulder part 55 in accordance with the rotation thereof in the pitch direction. Then, the support point 35 is located in a place which is shifted by a predetermined distance from the center of rotation in the pitch direction of this arm unit 50, and the force transmitted from the actuator 24 to the plate 51 through the first pitch link part 31 and the second pitch link part 32 becomes a driving force which causes the arm unit 50 to rotate in the pitch direction.

Thus, the driving force of the actuator 24 is transmitted to the arm unit 50 by the linkage mechanism 30 composed of the first pitch link part 31 and the second pitch link part 32, whereby the rotary motion in the pitch direction of the arm unit 50 will be caused. Then, the arm unit 50 is supported by the support member 28 on the outer base plate 21, and the first pitch link part 31 is rotatably supported on the outer base plate 21 and the inner base plate 22, so that the directions of rotation of the first pitch link part 31 and the second pitch link part 32 become the same direction as that of pitch rotation of the arm unit 50.

Figure 9:
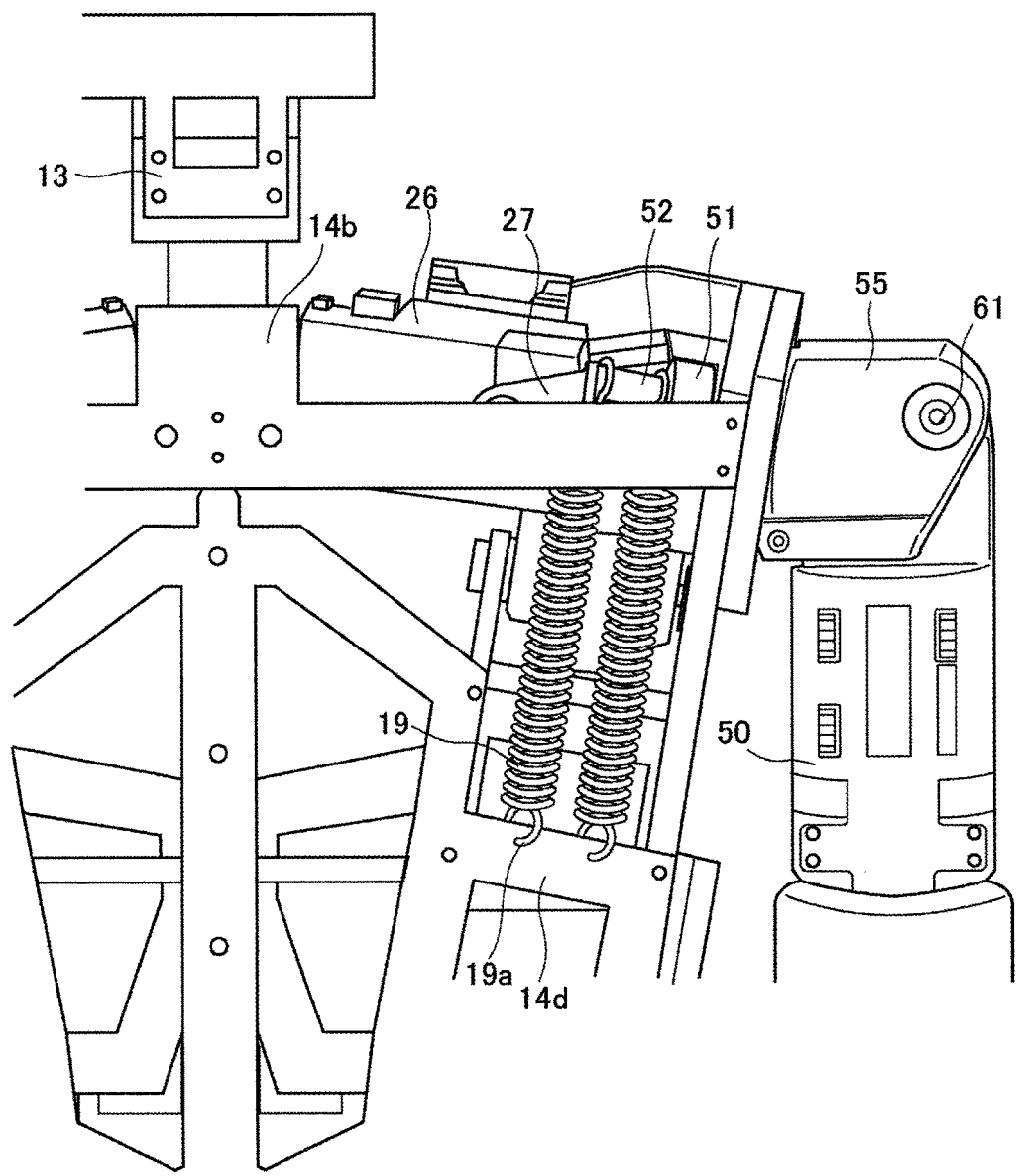
FIG. 9 is a second view showing the construction of the rotation driving mechanism for pitch rotation of the arm unit.

In addition, as shown in FIG. 6 and FIG. 7, there is arranged a spring mounting portion 52 extending from on the plate 51 along a shoulder width direction of the robot 10 (here, refer to FIG. 9 to be described later). Two springs 19 for applying an urging force to the posterior sternal part 14d are mounted on this spring mounting portion 52, as shown in FIG. 9. The connection positions of the springs 19 in the posterior sternal part 14d are denoted by 19a. The spring mounting portion 52 is on the plate 51 which pitch rotates together with the arm unit 50, and the connection position 19a is at the side of the posterior sternal part 14d which forms the upper half body skeletal structure of the robot 10, so the urging force by the springs 19 will produce a torque which contributes to the pitch rotation of the arm unit 50. This urging force by the springs 19 will be described later.

Here, note that although not directly related to the rotation driving of the arm unit 50, brief reference will also be made to the actuator 25 received in the driving unit 20. The actuator 25 is also a linear motion actuator, as in the case of the actuator 24, and is fixed to the outer base plate 21 and the inner base plate 22. The output shaft of the actuator 25 is connected to one end side of a rocking link part 18 which is rotatably mounted on the outer base plate 21 and the inner base plate 22 through a support point 18a. Then, to the other end side of the rocking link part 18, a transmission link part 17 is rotatably connected through a support point 18b, and the transmission link part 17 is further connected to the hip bone part 15. This rocking link part 18 has a seesaw shape as in the above-mentioned first pitch link part 31, and hence, the size, in particular the length dimensions, of the mechanism required to transmit the output of the actuator 25 can be suppressed, and further, it also becomes possible to attain amplification of the output of the actuator 25, and this also contributes to the reduction in size of the actuator 25.

In the upper right and left halves of the body of the robot 10, the output of the actuator 25 is transmitted to the hip bone part 15, whereby the upper half body of the robot 10 will be driven to rotate in the roll direction and in the yaw direction with respect to the pelvic part 16 due to an unillustrated construction of the hip bone part 15. Here, note that a construction for the rotational driving of the upper half body with respect to this pelvic part 16 does not make the core of the present invention, so a detailed explanation thereof is omitted.

Moreover, the actuator 25 is included in the driving unit 20, but the rocking link part 18 and the transmission link part 17, which are links related to the actuator 25, are not included in the driving unit 20 (refer to a state where the driving unit has been removed, as shown in FIG. 4). This is because when the connection between the transmission link part 17 and the hip bone part 15 is removed or disconnected at the time of removal of the driving unit 20, the rocking link part 18 and the transmission link part 17 will protrude from the housing of the driving unit 20, and handling thereof will become difficult. Of course, the driving unit 20 may be removed from the upper half body skeletal structure, so that the rocking link part 18 and the transmission link part 17 may be included in the driving unit 20.

Next, the actuator 26 will be explained. The actuator 26 is also a linear motion actuator, as in the case of the actuator 24. The actuator 26 has its output shaft connected to the arm unit 50 through the linkage mechanism to be described later which is composed of the first roll link part 56 and the second roll link part 57, thus forming the roll rotation structure for the arm unit 50. The actuator 26 is mounted through an attachment 27 to the plate 51, as shown in FIG. 6. Specifically, the attachment 27 is supported in its wall portions extending along the opposite side surfaces of the actuator 26 by means of a rotation shaft 27a, in such a manner as to make the main body of the actuator 26 rotatable in the roll direction, and at the same time, is fixed to the plate 51 so that its base portion 27b connecting the wall portions with each other is arranged on the plate 51. Thus, the reason why the attachment 27 supports the actuator 26 for roll rotation in this manner is that the posture of the actuator 26 with respect to the shoulder part 55 is made adjustable at the time of the roll rotation of the arm unit 50, as will be described later.

In addition, the base portion 27b of the attachment 27 is provided in its substantially central portion with a through hole 27c through which the output shaft 26a of the actuator 26 is able to extend. This through hole 27c corresponds to a hollow portion according to the present invention. Then, the output shaft 26a passes this through hole 27c, and further passes an unillustrated through hole formed in the plate 51, whereby it is inserted into the shoulder part 55 and is connected to the first roll link part 56 to be described later inside the shoulder part 55. Thus, the mounting of the actuator 26 to the plate 51 through the attachment 27 makes it possible for the main body of the actuator 26 to be arranged at the outside of the shoulder part 55, and at the same time for the output shaft 26a of the actuator 26 to be drawn into and out of the shoulder part 55, and hence, this corresponds to mounting by a mounting part according to the present invention. Then, in a state where the arm unit 50 is supported in the region R28 for pitch rotation, this plate 51 is pitch rotated in accordance with the rotation of the arm unit 50. For that reason, the actuator 26, which is mounted by the plate 51 and the attachment 27, itself is arranged such that it is rotated in the pitch direction in accordance with the pitch rotation of the arm unit 50 and the shoulder part 55. Here, note that the details of the roll rotation structure for the arm unit 50 including the actuator 26 will be described later.

<Support Structure by Driving Unit 20>

As mentioned above, each driving unit 20 is connected to the anterior clavicular part 14a and the posterior clavicular part 14b, respectively, in a state where the actuators 24, 25 are received in an accommodation space defined by the outer base plate 21 and the inner base plate 22 at a top front location and a top rear location. Further, the driving unit 20 is connected to the anterior sternal part 14c and the posterior sternal part 14d at a central front location and at a central rear location thereof, respectively. The driving unit 20 is also connected at its lower portion with the hip bone part 15 through the output shaft of the actuator 25, the rocking link part 18 and the transmission link part 17.

By such a mode of connection of the driving unit 20 with the upper half body skeletal structure, the driving unit 20 is connected with the individual bone parts 14a-14d corresponding to the upper half body support part, so as to support them from below. Then, as seen from figures, too, the connection points, corresponding to first connection points, between the driving unit 20 and the individual bone parts 14a-14d are at locations away from the backbone part 14 to one side of the robot 10 by a distance corresponding to a shoulder length of the robot 10, and are positioned at the side of the robot 10 further away from the support point 17a. In addition, when based on the fact that the support point 17a corresponding to the second connection point is a connection point on the haunch bone part 15 connected to the backbone part 14, a substantially triangular support frame will be formed by the first connection points, the second connection point, and the connection points of the individual bone parts 14a-14d and the backbone part 14. That is, the driving unit 20 itself will be included in one side of this support frame. At this time, the actuator 26 for the roll rotation driving of the arm unit 50 will be arranged in a space in the main body of the robot 10 surrounded by the upper half body skeletal structure composed of the backbone part 14 and the individual bone parts 14a-14d, and the driving unit 20, as can be understood from FIG. 1, FIG. 4, etc.

Here, as seen from figures, too, in this support frame, the driving unit 20 is in a state where the outer base plate 21 and the inner base plate 22 extend between the first connection points and the second connection point in their longitudinal directions. Because the outer base plate 21 and the inner base plate 22 are also base plates to which the actuators 24, 25 are fixed, the thickness of each of both the base plates is made to be suitably thick so that they should function as a housing for the driving unit 20. Accordingly, the rigidity of each of the outer base plate 21 and the inner base plate 22 is set relatively high.

Accordingly, when each of the base plates 21, 22 of the driving unit 20 is included in one side of the above-mentioned support frame, the rigidity of each of the base plates 21, 22 can be utilized as it is for the support of the upper half body skeletal structure of the robot 10, in particular, the bone parts 14a-14d. This means that an increase in the strength of the upper half body of the robot 10 can be attained even without the provision of a special support structure for the support of the upper half body skeletal structure, in other words, it is possible to suppress the weight of the upper half body from being increased for the increase in the strength of the upper half body of the robot 10.

Moreover, each arm unit 50 is not directly connected with the bone parts 14a-14d, but is mounted on the outer base plate 21 of the driving unit 20 through the shoulder part 55. Then, because the bone parts 14a-14d are formed of the sheet metal, as mentioned above, they serve to support the driving unit 20 in a resilient manner. Thus, by supporting the driving unit 20 in a resilient manner, a part of the load from the arm unit 50 can be absorbed by the resiliency of the bone parts 14a-14d. For that reason, the load to be supported by the support member 28 with the arm unit 50 mounted on the outer base plate 21 will be reduced, so there can be used the support member 28 with a relatively low permissible load such as, for example, a cross roller ring of which the permissible radial load and the permissible axial load is relatively low. As a consequence of this, the reduction in size of the support member 28 can be attained, and from this, too, the increase in the weight of the upper half body of the robot 10 can be suppressed.

Further, from the point of view of suppressing the increase in the weight of the upper half body of the robot 10, it can also be said that an arrangement is useful in which the actuator 24 for driving the arm unit 50 to rotate in the pitch direction is connected with the upper half body skeletal structure in a state of being fixedly received in the above-mentioned accommodation space which is formed in the driving unit 20. Due to the actuator 24 being arranged at the outside of the arm unit 50 and the shoulder part 55, the weight of the arm unit 50, etc., can be reduced in comparison with the case where the actuator 24 is arranged at the inside of the arm unit 50, etc. Because the arm unit 50, etc., is a member which is driven to rotate, the reduction in the weight thereof results in a decrease in the moment of the arm unit 50, etc., as well as a decrease in load at the time of rotation driving thereof. As a result, it becomes unnecessary to increase the load carrying capacity of the upper half body skeletal structure to a large extent, and thus, this is considered to contribute to suppressing an increase in the weight of the upper half body. Here, note that in order to drive the arm unit 50 to rotate in the pitch direction in the state where the actuator 24 is arranged at the outside of the arm unit 50, etc., an arrangement is extremely useful in which the output from the linear motion output shaft of the actuator 24 is transmitted to the arm unit 50 by the operation of the linkage mechanism 30 which will be described later.

<Pitch Rotation Operation by Link Mechanism 30>

The linkage mechanism 30 is composed of the first pitch link part 31 and the second pitch link part 32 as mentioned above, and serves to transmit the driving force of the actuator 24 to the plate 51 connected with the arm unit 50, whereby the arm unit 50 will be driven to rotate in the pitch direction. Then, the details of the pitch rotation operation of this linkage mechanism 30 will be explained based on FIG. 10, FIG. 11, FIG. 12A, and FIG. 12B.

FIG. 10 shows a state inside the driving unit 20 around the linkage mechanism 30 in a state where in the pitch rotation direction, the arm unit 50 extends in the vertically downward direction, i.e., in a state where the arm unit 50 is in the most downward or lowermost position in which it extends in the most downward direction along the gravity component in the pitch rotation direction in a state where the arm unit 50 is rotatably supported by the support member 28. On the other hand, FIG. 11 shows a state inside the driving unit 20 around the linkage mechanism 30 in a state where in the pitch rotation direction, the arm unit 50 extends in the horizontal direction, i.e., in a state where the arm unit 50 is in a horizontal raised position in which it is caused to rise by pitch rotation from the most downward or lowermost position against the gravity component in a state where the arm unit 50 is rotatably supported by the support member 28. That is, FIG. 10 represents a state where the gravity load on the actuator 24 by the self weight of the arm unit 50 becomes a minimum, and FIG. 11 represents a state where the gravity load becomes a maximum.

Figure 12:
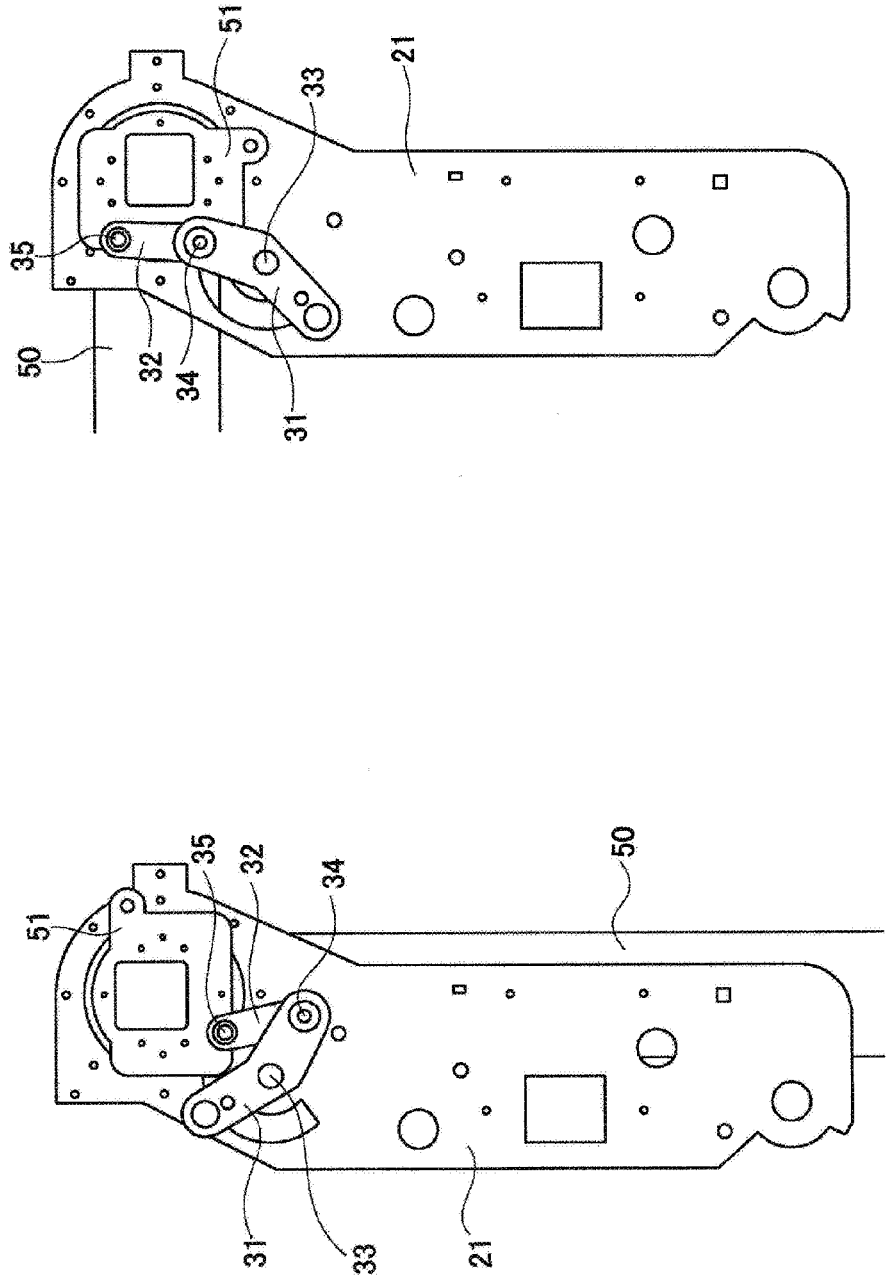
FIG. 12A and FIG. 12B each is a first view showing the operation of a link mechanism included in the rotation driving mechanism for pitch rotation of the arm unit.

Further, FIG. 12A and FIG. 12B each shows the individual link parts constituting the linkage mechanism 30 each in a state of being projected on a z-y plane so as to make it easy to grasp the state of each link part. For that reason, the first pitch link part 31 is represented by a recumbent V shape or a doglegged shape in which a straight line connecting between the connection point 31e and the first support point 33 and a straight line connecting between the first support point 33 and the second support point 34 bend with respect to each other. Here, note that specifically, FIG. 12A shows the state of the linkage mechanism 30 in the case of the arm unit 50 being in the lowermost position, as shown in FIG. 10, and FIG. 12B represents the state of the linkage mechanism 30 in the case of the arm unit 50 being in the horizontal raised position, as shown in FIG. 11.

Here, reference will be made to the operation of the linkage mechanism 30 in the case of the arm unit 50 being driven to rise by pitch rotation from the lowermost position to the horizontal raised position in the robot 10. In cases where the arm unit 50 is in the lowermost position in the robot 10, the output shaft 24b of the actuator 24 is in a state of being located at the most upward or uppermost position inside the driving unit 20, as shown in FIG. 10. Thus, as shown in FIG. 12A, the second support point 34 is in a state where it is located at the most downward or lowermost position which the second support point 34 can take. For that reason, being influenced by the position of this second support point 34, there occurs a state where the second pitch link part 32 has drawn in the plate 51 to the downward direction, and hence, the lowermost position of the arm unit 50 through the state of the plate 51 shown in FIG. 12A will be decided.

In this manner, when the output shaft 24b is drawn into the main body 24a from the state shown in FIG. 12A under the drive of the actuator 24 (i.e., when the output shaft 24b moves linearly to the downward direction in the robot 10), the first pitch link part 31 will rotate around the first support point 33 in a counter clockwise direction, in FIG. 12A. That is, due to the downward linear movement of the output shaft 24b, the connection point 31e moves in the downward direction, and at the same time, the second support point 34 moves in the upward direction. As a result, the second pitch link part 32 will push out the plate 51 in a clockwise direction, and hence, in FIGS. 12A and 12B, the arm unit 50 will rotate and rise in the clockwise direction in accordance with the rotation of the plate 51, whereby it will arrive at the horizontal raised position shown in FIG. 12B.

Here, in the process of the rise due to pitch rotation of this arm unit 50, attention is focused on an angle θ (hereinafter, referred to as an "interlink angle") which is formed by a straight line connecting between the first support point 33 and the second support point 34 (hereinafter, referred to as a "first straight line"), and a straight line connecting between the second support point 34 and the third support point 35 (hereinafter, referred to as a "second straight line"). Because the first support point 33 is formed between the outer base plate 21 and the first pitch link part 31, and between the inner base plate 22 and the first pitch link part 31, the position of the first support point 33 remains unchanged with respect to the outer base plate 21 or the like, irrespective of the state of the first pitch link part 31. Then, as the first pitch link part 31 rotates in the counter clockwise direction from the state shown in FIG. 12A, the second support point 34 goes up around this first support point 33, and the interlink angle θ, being an acute angle at the beginning, exceeds 90 degrees and comes to an obtuse angle, and then it becomes an angle close to 180 degrees in the final state shown in FIG. 12B. That is, due to the counter clockwise rotation of the first link part 31, the interlink angle θ gradually opens so as to approach 180 degrees, and the third support point 35 goes up so as to separate more from the first support point 33.

As a result, in the state where the arm unit 50 has risen to the horizontal, as shown in FIG. 12B, the first straight line connecting between the first support point 33 and the second support point 34 and the second straight line connecting between the second support point 34 and the third support point 35 will extend substantially on a straight line and along the z axis. At this time, the gravity load by the gravity component of the arm unit 50 becomes the maximum, but the three support points 33, 34, 35 in the linkage mechanism 30 are located on the first support point 33 substantially in alignment with each other in a straight line. For that reason, most of the gravity load transmitted from the arm unit 50 can be supported at the first support point 33 which is supported by the outer base plate 21, etc., thus making it possible to reduce the load transmitted to the side of the actuator 24 through the connection point 31e.

Moreover, in the linkage mechanism 30, in cases where the arm unit 50 is in a position in the vicinity of the horizontal raised position, the shapes and dimensions of the first pitch link part 31 and the second pitch link part 32 are decided so that the ratio of the amount of rotation of the plate 51 connected with the arm unit 50 with respect to the amount of displacement of the output shaft 24b of the actuator 24 becomes smaller, in comparison with the case where the arm unit 50 is in a position in the vicinity of the lowermost position. As a result of this, a speed reduction ratio, which is the ratio of the amount of displacement of the arm unit 50 with respect to the amount of displacement of the servo-motor mounted on the actuator 24, will be set to be larger, as the arm unit 50 approaches the horizontal raised position. For that reason, in the case where the arm unit 50 is in the vicinity of the lowermost position, the speed reduction ratio is relatively small, but the gravity load by the arm unit 50 is also small, so the degree of influence with respect to the actuator 24 can be kept small. On the other hand, in the vicinity of the horizontal raised position in which the gravity load by the arm unit 50 becomes relatively large, by making the speed reduction ratio larger, the degree of influence of the gravity load by the arm unit 50 to the actuator 24 can be reduced as much as possible, as a consequence of which it is possible to attain the reduction in size of the actuator 24.

Figure 13:
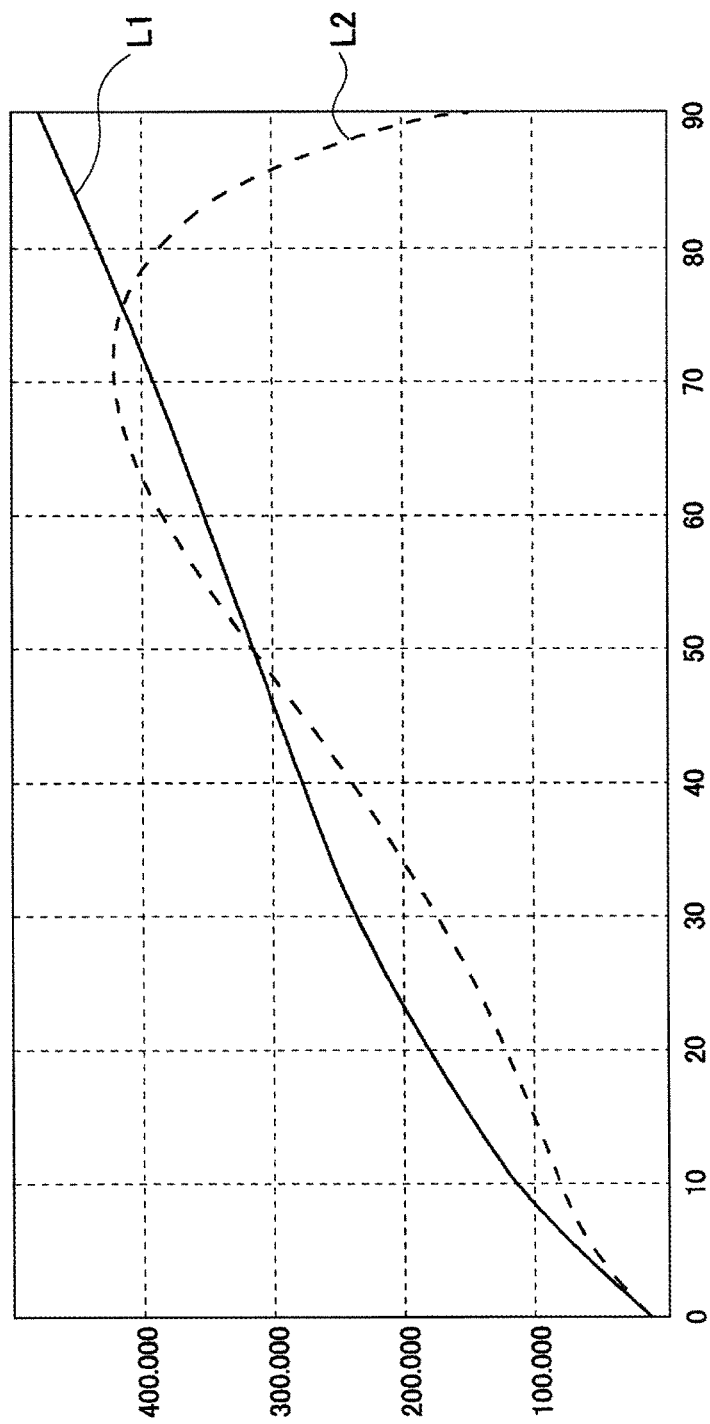
FIG. 13 is a second view showing the operation of the link mechanism included in the rotation driving mechanism for pitch rotation of the arm unit.

In addition, in the robot 10, application of an urging force by means of the springs 19 is carried out, as shown in FIG. 9. This will be explained below based on FIG. 13. FIG. 13 shows the change over time of the gravity load by the arm unit 50 with respect to the angle of rotation of the arm unit 50, and the change over time of the urging force of the springs 19, by means of lines L1, L2, respectively. Here, note that on the axis of abscissa in FIG. 13, the angle of rotation in the case of the arm unit 50 being in the lowermost position (i.e., in the case of the state shown in FIG. 12A) is 0 degrees, and the angle of rotation in the case of the arm unit 50 being in the horizontal raised position (i.e., in the case of the state shown in FIG. 12B) is 90 degrees. In addition, the urging force of the springs 19 is applied in a direction in which torque for raising and rotating the arm unit 50 is generated in a range of angle of rotation shown in FIG. 13.

Here, as the arm unit 50 rotates and rises from the lowermost position to the horizontal raised position, the gravity load increases gradually, as can be seen from the line L1. At this time, as can be seen from the line L2, the urging force of the springs 19 is as follows: the mounting position and the spring constant of each spring are decided so that the urging force thereof becomes larger than the gravity load represented by the line L1 in a region before the arm unit 50 reaches the horizontal raised position (i.e., a region or position in which the angle of rotation substantially becomes from 50 degrees to 75 degrees, and which is called "a predetermined load region"). By such a design of the springs 19, in a region where the gravity load by the arm unit 50 becomes relatively large, the arm unit 50 can be supported by the urging force of the springs 19 in an effective manner, and the load applied to the actuator 24 can be reduced. Here, note that in a region where the gravity load by the arm unit 50 becomes further larger than that in the predetermined load region (i.e., a region or position in which the angle of rotation of the arm unit 50 substantially becomes from 75 degrees to 90 degrees), the speed reduction ratio due to the linkage mechanism 30 becomes relatively large, as mentioned above, and hence, even if the urging force of the springs 19 becomes lower in comparison with the load gravity, as shown in FIG. 13, the gravity load applied to the actuator 24 can be mitigated.

Further, as shown in FIG. 13, in a region where the gravity load by the arm unit 50 becomes smaller than that in the predetermined load region (i.e., a region or position in which the angle of rotation of the arm unit 50 substantially becomes from 0 degrees to 50 degrees), the speed reduction ratio due to the linkage mechanism 30 is relatively small, as mentioned above, but the gravity load by the arm unit 50 itself is relatively small, so even if the urging force of the springs 19 becomes lower in comparison with the load gravity, as shown in FIG. 13, the gravity load applied to the actuator 24 is not so large as to prevent the reduction in size of the actuator 24.

Thus, by setting the urging force of the springs 19 in consideration of the correlation thereof with the speed reduction ratio by the linkage mechanism 30, the gravity load applied to the actuator 24 can be reduced in the entire rotational driving range of the arm unit 50, and the reduction in size of the actuator 24 can be attained.

Here, returning to FIGS. 12A and 12B, reference will again be made to the linkage mechanism 30. In cases where the arm unit 50 is in the horizontal raised position, as shown in FIG. 12B, the gravity load by the arm unit 50 can be supported at the first support point 33 in an efficient manner, as mentioned above, by the second support point 34 and the third support point 35 being located substantially in alignment with each other along the z axis on the basis of the first support point 33. At this time, the first pitch link part 31 is formed in a shape (i.e., a recumbent V or doglegged shape) bent unevenly to the side of the third support point 35, as mentioned above. For that reason, in cases where the connection point 31e of the first pitch link part 31 is displaced from the state shown in FIG. 12A to the state shown in FIG. 12B, the first straight line connecting between the first support point 33 and the second support point 34 and the second straight line connecting between the second support point 34 and the third support point 35 are easier to come into alignment with each other due to the bent shape of the first pitch link part 31. In the linkage mechanism 30, in cases where the arm unit 50 is in the horizontal raised position, it is easy to obtain the effect due to the support of the gravity load by the first support point 33 because the first straight line and the second straight line come to a state of being closer to alignment with each other. Accordingly, the above-mentioned bent shape in the first pitch link part 31 need only be designed in consideration of the support of the gravity load by this first support point 33.

In addition, it is also preferable to decide the above-mentioned bent shape in the first pitch link part 31, from the point of view of the ease of carrying out rotational driving of the first pitch link part 31 from the state in which the first straight line and the second straight line has become aligned with each other. In the case where the first straight line and the second straight line has become aligned with each other, if the straight line connecting between the connection point 31e and the first support point 33 is located on an extension of the first straight line, etc., it becomes difficult to apply a return torque to the first pitch link part 31, at the time of returning from the state shown in FIG. 12B to the state shown in FIG. 12A. Accordingly, it is preferable to decide the bent shape in the first pitch link part 31 in consideration of the ease of carrying out the rotational driving of the first pitch link part 31.

Here, note that in this embodiment, a cross roller ring can be used as the support member 28 for the rotational support of the arm unit 50, as mentioned above. The cross roller ring is a support member capable of supporting loads from many directions. For that reason, for the support of loads with respect to the arm unit 50, a cross roller operates in a suitable manner, and accordingly, the rigidity required of the actuator 24, which serves to manage the pitch rotation of the arm unit 50, can be made small, and from this, too, the reduction in size of the actuator 24 can be attained.

<Roll Rotation Operation of Arm Unit 50>

Figure 14A:
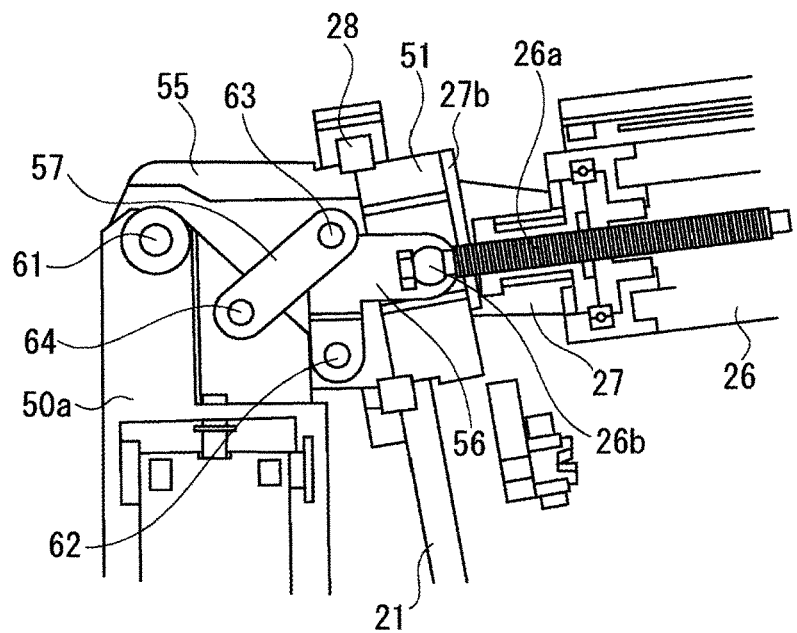
FIG. 14A is a first view showing the operation of the link mechanism included in the roll rotation structure shown in FIG. 6 and FIG. 7.
Figure 14B:
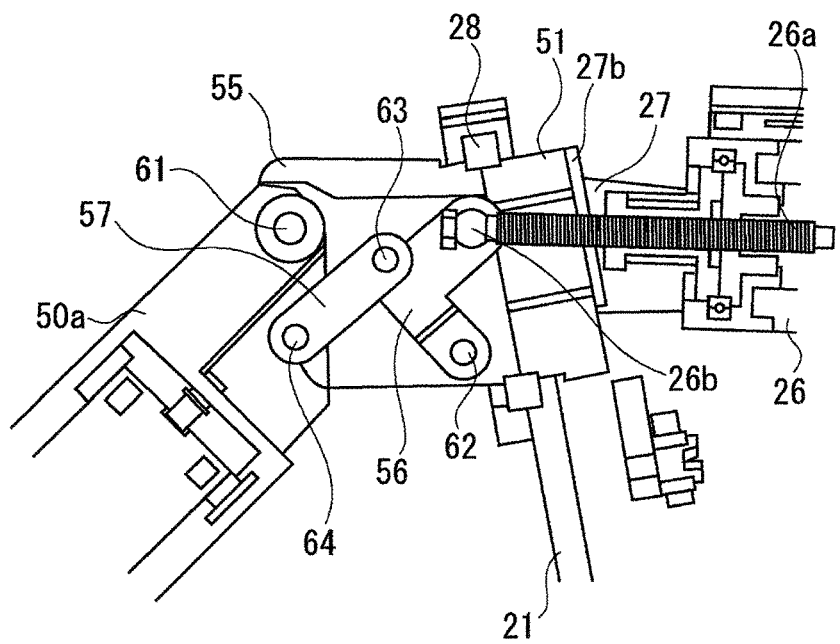
FIG. 14B is a second view showing the operation of the link mechanism included in the roll rotation structure shown in FIG. 6 and FIG. 7.
Figure 14C:
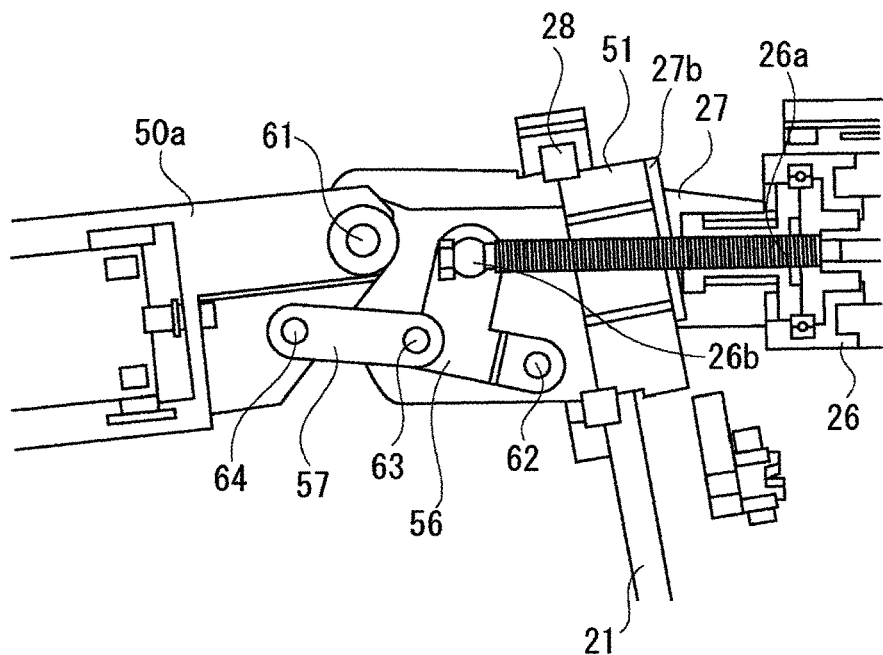
FIG. 14C is a third view showing the operation of the link mechanism included in the roll rotation structure shown in FIG. 6 and FIG. 7.

As mentioned above, the roll rotation driving of the arm unit 50 is carried out by the arm unit 50 being rotated around the roll support shaft 61 by means of the output of the actuator 26. Here, reference will be made to the construction of the linkage mechanism formed in the shoulder part 55 and the operation of the linkage mechanism in order to carry out the roll rotation driving of the arm unit 50, based on FIG. 14A through FIG. 14C. FIG. 14A through FIG. 14C are cross sectional views in A-A cross section shown in FIG. 7, wherein FIG. 14A shows a state where the arm unit 50 extends in the vertical downward direction in the direction of roll rotation; FIG. 14C shows a state where the arm unit 50 extends substantially in the horizontal direction in the direction of roll rotation; and FIG. 14B shows an intermediate state between the state shown in FIG. 14A and the state shown in FIG. 14C, i.e., a state where the arm unit 50 is roll rotated downward to a position of about 45 degrees in the direction of roll rotation.

As mentioned above, the actuator 26 for roll rotation driving is fixed to the plate 51 through the attachment 27. Due to fixing by this attachment 27, the main body of the actuator 26 itself is located at the outside of the shoulder part 55, and at the same time the output shaft 26a passes through the through hole 27c in the attachment 27 so that it can be drawn into and out of the plate 51 and the shoulder part 55. Here, as shown in FIG. 14A through FIG. 14C, in order for the output from the actuator 26 to produce an angular moment for the roll rotation of the arm unit 50, a linkage mechanism composed of the first roll link part 56 and the second roll link part 57 (hereinafter, referred to as a "roll rotation linkage mechanism") is formed between the output shaft 26a of the actuator 26 and the connection plate 50a of the arm unit 50. The roll rotation linkage mechanism serves to connect the output shaft 26a of the actuator 26 and the arm unit 50 for the roll rotation of the arm unit 50, and so it corresponds to a connection part of the present invention.

The first roll link part 56 constituting the roll rotation linkage mechanism has a substantially L-letter shape, and the output shaft 26a of the actuator 26 is connected with a connection portion 26b at a tip end side of one extending portion of the L-shaped first roll link part. In addition, at the tip end side of the other extending portion of the L-shaped first roll link part 56, the first roll link part 56 is rotatably supported by a support part 62 so as to be rotatable in the roll direction with respect to the shoulder part 55. Specifically, the support part 62 rotatably supports the first roll link part 56 by means of a bearing, and the support part 62 corresponds to a first shoulder support part of the present invention. Then, at a base end of the first roll link part 56 having the L-letter shape, i.e., at a location at which the two extending portions thereof are joined to each other, the second roll link part 57 constituting the roll rotation linkage mechanism is supported by a support part 63 so as to be rotatable in the roll direction. Specifically, the support part 63 rotatably supports the first roll link part 56 and the second roll link part 57 by means of bearings, and the support part 63 corresponds to a second shoulder support part of the present invention. Then, this second roll link part 57 has a linear shape, and the support part 63 is arranged at one end side thereof.

Further, at the other end side of the second roll link part 57, the second roll link part 57 and the connection plate 50a of the arm unit 50 are rotatably supported by a support part 64 so as to be rotatable in the roll direction with respect to each other. Specifically, the support part 64 is rotatably supported by a bearing, and a rotational support position by the support part 64 is also a location at which the roll rotation linkage mechanism is connected to the arm unit 50, and so it corresponds to a connection portion according to the present invention.

With the roll rotation link mechanism constructed in this manner, by the output shaft 26a of the actuator 26 being drawn into and out of the shoulder part 55, the first roll link part 56 and the second roll link part 57 are displaced in association with each other, so that the output of the actuator 26 is transmitted from the second roll link part 57 at a rotational support location (connection location) between the second roll link part 57 and the connection plate 50a. As shown in FIG. 14A, etc., this rotational support location is away a predetermined distance from the support location of the roll support shaft 61 in the roll rotation surface, and hence, the output transmitted from the second roll link part 57 acts, as a consequence, to produce an angular moment to roll rotate the connection plate 50a of the arm unit 50 around the roll support shaft 61.

Here, reference will be made to the specific operation of the roll rotation link mechanism, based on FIG. 14A through FIG. 14C. As shown in FIG. 14A, the state where the arm unit 50 extends in the vertical downward direction in the direction of roll rotation is a state where the output shaft 26a of the actuator 26 is located nearest to the main body side of the actuator 26, in other words, a state where an amount of insertion of the output shaft 26a into the shoulder part 55 is the smallest. At this time, the L-shaped first roll link part 56 is in a state where the support part 62 and the support part 63 are located substantially in a line along the vertical direction, and the connection portion 26b of the output shaft 26a is located at the side of the support part 63. As the output shaft 26a of the actuator 26 moves linearly toward the direction of the shoulder part 55 from this state, the first roll link part 56 rotates around the support part 62 in the counterclockwise direction, and arrives at a state shown in FIG. 14B. At this time, the support part 63 moves to the left of the position shown in FIG. 14A, and as a result, the connection plate 50a of the arm unit 50 will be pushed out to the left side of FIG. 14B by means of the second roll link part 57. The connection plate 50a is supported by the shoulder part 55 through the roll support shaft 61 in such a manner as to be rotatable in the roll direction, and so it is pushed out by the second roll link part 57 as mentioned above, as a result of which the roll rotation of the arm unit 50 will be achieved.

As the output shaft 26a of the actuator 26 further moves linearly toward the interior of the shoulder part 55 from the state shown in FIG. 14B, the first roll link part 56 further rotates around the support part 62 in the counterclockwise direction, and arrives at a state shown in FIG. 14C. At this time, the support part 63 moves to the leftmost position in this figure in the range of the roll rotation of the arm unit 50. As a result, the connection plate 50a of the arm unit 50 will be pushed out to the leftmost side by the second roll link part 57, so that the arm unit 50 will be in a state of extending substantially in the horizontal direction in the direction of roll rotation.

According to the above-mentioned roll rotation linkage mechanism, in the case where the arm unit 50 arrives at the state shown in FIG. 14C from the state shown in FIG. 14A by the roll rotation thereof, the support part 63 rotates around the support part 62 in the counterclockwise direction in such a manner as to draw a circular arc, and the amount of push-out of the connection plate 50a by the second roll link part 57 accordingly changes. As a result, in the case where the arm unit 50 extends substantially in the horizontal direction, the ratio of the amount of roll rotation of the arm unit 55 with respect to the displacement of the linear motion actuator 26 becomes smaller, i.e., the speed reduction ratio with respect to the displacement of the linear motion actuator 26 becomes larger, in comparison with the case where the arm unit 50 extends in the vertical direction. This means that as the arm unit 50 approaches the horizontal state, a rotational torque required for supporting the state of the arm unit 50 becomes larger, and hence, the speed reduction ratio is made gradually larger as mentioned above, and it can be avoided that the output required of the actuator 26 becomes large to an excessive extent, thus making it possible to attain the reduction in size of the actuator 26.

Moreover, in order to achieve such an operation of the roll rotation linkage mechanism, it is necessary for the first roll link part 56 to be rotated around the support part 62, and as a result, the position in height of the connection portion 26b of the output shaft 26a does not always become constant. Accordingly, in order to cope with the variation of the position in height of this connection portion 26b, the actuator 26 is connected with the shoulder part 55 by means of the attachment 27, in a state where it is rotatably supported by the rotation shaft 27a so as to be rotatable in the roll direction, whereby the posture thereof is adjusted in a suitable manner.

In the construction for the roll rotation driving of the arm unit 50 constructed in this manner, the actuator 26 is arranged so as to be located at the outside of the shoulder part 55 through the attachment 27. As a result, it is not necessary to accommodate the actuator 26 in the interior of the shoulder part 55 as in the conventional technology, and the shoulder part 55 can be reduced in size. With this, at the time of driving the arm unit 50 to rotate in the pitch direction or in the roll direction, the shoulder part 55 becomes hard to interfere with other component members, thus making it possible to provide a wide movable range of the robot 10 around the shoulder. In addition, a saving in weight of the robot 10 can also be attained by the reduction in size of the shoulder part 55, and so it becomes possible to suppress the energy consumption required for driving the robot.

Embodiment 2

Figure 15:
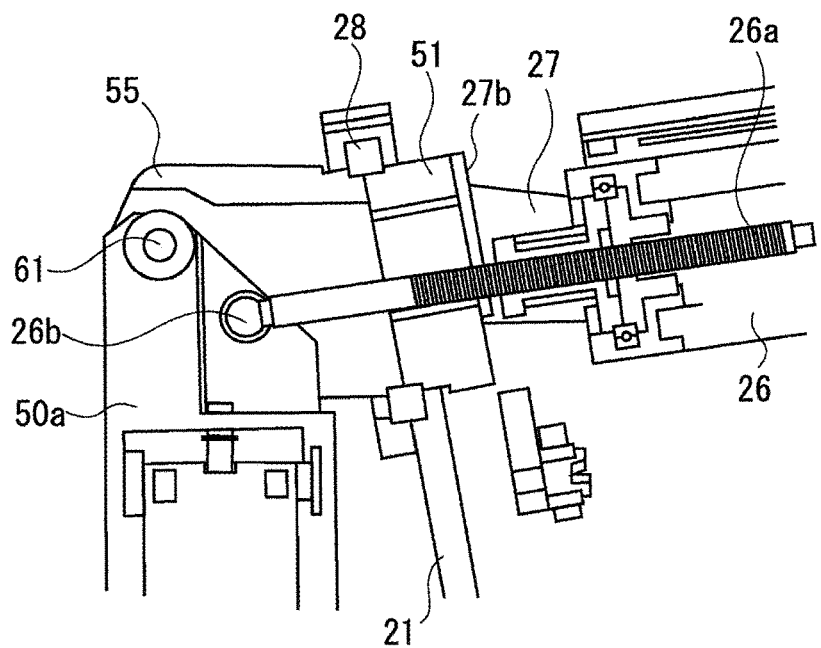
FIG. 15 is a view showing a roll rotation structure according to another embodiment.

Reference will be made to a second embodiment of a roll rotation structure for roll rotation driving of the arm unit 50, based on FIG. 15. FIG. 15 shows the roll rotation structure according to the second embodiment, and corresponds to FIG. 14A. Specifically, with the roll rotation structure shown in FIG. 15, similar to the above-mentioned first embodiment, the actuator 26 is mounted so as to be located at the outside of the shoulder part 55 by means of the attachment 27, but the output shaft 26a of the actuator 26 is directly connected with the connection plate 50a of the arm unit 50, without the provision of a construction which corresponds to the above-mentioned roll rotation linkage mechanism as a construction of the connection part connecting the output shaft 26a and the arm unit 50 with each other. That is, the connection portion 26b of the output shaft 26a will be arranged on the connection plate 50a. For that reason, in the second embodiment, the direct connection between the output shaft 26a and the connection plate 50a in the connection portion 26b corresponds to the connection by the connection part according to the present invention.

With the roll rotation structure of having such a construction, although the advantages resulting from the speed reduction ratio by the above-mentioned roll rotation linkage mechanism can not be obtained, it becomes possible to attain the reduction in size of the shoulder part 55, thus making it possible to eliminate inconveniences due to the increase in size of the shoulder part 55.

REFERENCE SIGNS LIST

10 . . . robot,
14 . . . backbone part,
14a . . . anterior clavicular part,
14b . . . posterior clavicular part,
14c . . . anterior sternal part,
14d . . . posterior sternal part,
15 . . . hip bone part,
19 . . . spring,
20 . . . driving unit
21 . . . outer base plate,
22 . . . inner base plate,
24, 25, 26 . . . actuators,
27 . . . attachment,
28 . . . support member,
30 . . . linkage mechanism
31 . . . first pitch link part
32 . . . second pitch link part
50 . . . arm unit,
50a . . . connection plate
51 . . . plate
55 . . . shoulder part,
61 . . . roll support shaft
56 . . . first roll link part
57 . . . second roll link part
62, 63, 64 . . . support parts

What is claimed is:

1. A roll rotation structure in a robot for rotationally driving, in a roll direction of the robot, an arm unit mounted on a shoulder part of the robot through a roll support part so as to be rotatable in the roll direction of the robot, the roll rotation structure comprising:
a linear motion actuator having an output shaft that moves linearly;
a mounting part by which the linear motion actuator is mounted on the shoulder part in such a manner that a main body of the linear motion actuator is located at the side of a main body of the robot adjacent to the shoulder part, and that the output shaft of the linear motion actuator can be drawn into and out of the shoulder part; and
a connection part that connects the output shaft and the arm unit in such a manner that an output from the output shaft of the linear motion actuator produces an angular moment in the roll direction in the roll support part of the arm unit, wherein
the mounting part has a fixed plate for fixing the linear motion actuator to the shoulder part;
the fixed plate is positioned between the shoulder part and the main body of the linear motion actuator; and
the linear motion actuator is mounted on the fixed plate so as to be rotatable in the roll direction.

2. The roll rotation structure in a robot as set forth in claim 1, wherein
the shoulder part and the arm unit are both constructed so as to rotate in a pitch direction of the robot; and
the linear motion actuator is mounted on the fixed plate in such a manner that the linear motion actuator pitch rotates together with the shoulder part and the arm unit.

3. The roll rotation structure in a robot as set forth in claim 2, wherein
the fixed plate has a hollow portion through which the output shaft of the linear motion actuator extends; and
the connection part connects the output shaft of the linear motion actuator, which passes through the hollow portion and arrives at the shoulder part, and the arm unit with each other.

4. The roll rotation structure in a robot as set forth in claim 1, wherein
the connection part connects the output shaft of the linear motion actuator to the arm unit through a predetermined linkage mechanism composed of one or a plurality of link members, at a connection position away apart a predetermined distance from the roll support part in a roll rotation surface by the angular moment in the roll direction.

5. The roll rotation structure in a robot as set forth in claim 4, wherein
the predetermined linkage mechanism has:
a first roll link part which is connected through a first shoulder support part to the shoulder part so as to be rotatable in the roll direction, and with which the output shaft of the linear motion actuator is connected; and
a second roll link part which is connected through a second shoulder support part to the first roll link part so as to be rotatable in the roll direction, and which is connected with the arm unit at the connection position.

6. The roll rotation structure in a robot as set forth in claim 4, wherein
in cases where the arm unit arrives at a horizontal raised position in which the arm unit becomes the closest to a horizontal state, from a lowermost position in which the arm unit becomes close to a state of extending in the most downward direction with respect to the shoulder part in a roll rotation movement range in the roll direction of the arm unit, the predetermined link mechanism is formed in such a manner that in the case where the arm unit is located in a predetermined upper position including the horizontal raised position, a ratio of an amount of roll rotation of the arm unit with respect to an amount of displacement of the linear motion actuator becomes smaller, in comparison with the case where the arm unit is located in a predetermined lower position including the lowermost position.

7. The roll rotation structure in a robot as set forth in claim 1, wherein
the connection part directly connects the output shaft of the linear motion actuator to the arm unit, at a connection position away a predetermined distance from the roll support part in a roll rotation surface by the angular moment in the roll direction.

8. The roll rotation structure in a robot as set forth in claim 1, wherein
the robot has:
a columnar backbone part extending in an upward direction from a hip bone part of the robot;
an upper half body support part connected to the backbone part and extending from the backbone part to a side of the robot; and
a driving unit on which the arm unit is mounted through the shoulder portion, and which is connected at a first connection point on the upper half body support part and at a second connection point on the hip bone part, which are away from a connection point of the upper half body support part and the backbone part to a side thereof by predetermined distances, respectively;
wherein the linear motion actuator mounted to the shoulder part by the mounting part is arranged in a space surrounded by the backbone part, the upper half body support part and the driving unit.

* * * * *